US008840275B2

(12) United States Patent
Parker et al.

(10) Patent No.: US 8,840,275 B2
(45) Date of Patent: Sep. 23, 2014

(54) LIGHTING ASSEMBLY WITH ADJUSTABLE LIGHT OUTPUT

(75) Inventors: Jeffery R. Parker, Richfield, OH (US); Timothy A. McCollum, Avon Lake, OH (US); Fumitomo Hide, San Jose, CA (US); Alexey Titov, Sagamore Hills, OH (US); Ian Hardcastle, Sunnyvale, CA (US)

(73) Assignee: Rambus Delaware LLC, Brecksville, OH (US)

( * ) Notice: Subject to any disclaimer, the term of this patent is extended or adjusted under 35 U.S.C. 154(b) by 146 days.

(21) Appl. No.: 13/420,968

(22) Filed: Mar. 15, 2012

(65) Prior Publication Data

US 2012/0236590 A1  Sep. 20, 2012

Related U.S. Application Data

(60) Provisional application No. 61/454,221, filed on Mar. 18, 2011, provisional application No. 61/453,756, filed on Mar. 17, 2011, provisional application No. 61/602,193, filed on Feb. 23, 2012.

(51) Int. Cl.
*F21S 8/00* (2006.01)
(Continued)

(52) U.S. Cl.
CPC ............ *G02B 6/0058* (2013.01); *G02B 6/0035* (2013.01); *G02B 6/0076* (2013.01); *G02B 6/005* (2013.01); *F21K 9/13* (2013.01); *F21K 9/56* (2013.01); *F21Y 2101/02* (2013.01); *F21K 9/52* (2013.01)
USPC ........... 362/281; 362/282; 362/283; 362/606; 362/607; 362/616; 362/293

(58) Field of Classification Search
CPC ............... F21K 9/00; F21K 9/54; F21V 9/16; F21V 9/10; F21V 17/02; F21V 14/08; F21V 14/06; F21S 6/003; G02B 6/0058
USPC ......... 362/607, 606, 616, 277, 281–283, 293, 362/231, 84, 253; 353/84
See application file for complete search history.

(56) References Cited

U.S. PATENT DOCUMENTS

| 5,136,480 A | 8/1992 | Pristash | 362/31 |
| 6,528,937 B1 | 3/2003 | Van Gorkom | 313/485 |

(Continued)

FOREIGN PATENT DOCUMENTS

| JP | 2002-237203 | 8/2002 | F21S 2/00 |
| KR | 20-2011-0000723 | 1/2011 | F21V 14/00 |
| WO | WO 2009122322 A1 * | 10/2009 | F21V 7/00 |

OTHER PUBLICATIONS

International Search Report and Written Opinion of the International Searching Authority re PCT/US2012/029188 issued Mar. 15, 2012 mailed Sep. 28, 2012. 10 pages.
(Continued)

*Primary Examiner* — Thomas M Sember
*Assistant Examiner* — William N Harris
(74) *Attorney, Agent, or Firm* — Renner, Otto, Boisselle & Sklar, LLP

(57) ABSTRACT

A lighting assembly includes a light guide having opposed major surfaces between which light propagates by total internal reflection, a light input edge, and two light output regions of different optical characteristics and at least one of which is associated with a corresponding one of the major surfaces. The lighting assembly also includes a light source located adjacent the light input edge. The light source and the light guide variably positionable relative to one another to vary a location on the light input edge at which the light is input to the light guide such that the light is emitted from the light guide selectively apportioned between the light output regions so that a characteristic of the light output from the lighting assembly is modified based on the optical characteristics associated with the light output regions and the relative positioning of the light source and the light guide.

30 Claims, 17 Drawing Sheets

(51) Int. Cl.

| | | |
|---|---|---|
| *F21V 17/02* | (2006.01) | |
| *B60Q 1/14* | (2006.01) | |
| *F21V 7/04* | (2006.01) | |
| *F21V 9/00* | (2006.01) | |
| *F21V 8/00* | (2006.01) | |
| *F21K 99/00* | (2010.01) | |
| *F21Y 101/02* | (2006.01) | |

(56) References Cited

U.S. PATENT DOCUMENTS

| | | | |
|---|---|---|---|
| 7,161,313 B2 | 1/2007 | Piepgras et al. | 315/318 |
| 7,223,007 B1 | 5/2007 | Fredley et al. | 362/616 |
| 7,331,681 B2 | 2/2008 | Pohlert et al. | 362/18 |
| 7,651,243 B2 | 1/2010 | McGuire, Jr. et al. | 362/293 |
| 7,663,733 B2 | 2/2010 | Glent-Madsen et al. | 355/53 |
| 7,665,865 B1 | 2/2010 | Hulse et al. | 362/277 |
| 7,806,538 B2 | 10/2010 | Ajiki et al. | 362/19 |
| 2007/0019408 A1* | 1/2007 | McGuire et al. | 362/231 |
| 2007/0263388 A1 | 11/2007 | Lai et al. | 362/287 |
| 2009/0091915 A1 | 4/2009 | Eriksson | 362/84 |
| 2009/0103293 A1 | 4/2009 | Harbers et al. | 362/231 |
| 2010/0033948 A1* | 2/2010 | Harbers et al. | 362/84 |
| 2010/0246158 A1 | 9/2010 | Van Gorkom et al. | 362/19 |
| 2010/0315810 A1 | 12/2010 | Tseng | 362/234 |
| 2010/0321931 A1 | 12/2010 | McDermott | 362/190 |
| 2011/0026260 A1* | 2/2011 | Ko | 362/285 |
| 2011/0188228 A1* | 8/2011 | Li | 362/84 |
| 2011/0234076 A1 | 9/2011 | Simon et al. | |

OTHER PUBLICATIONS

PCT International Preliminary Report on Patentability dated Sep. 26, 2013 in International Application No. PCT/US2012/029188. 7 pages.

* cited by examiner

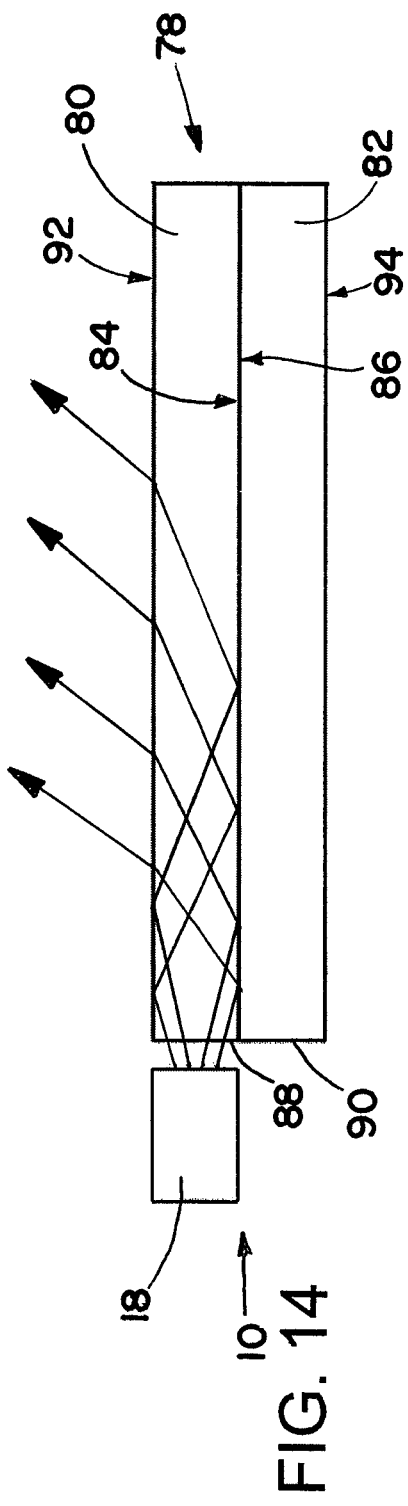
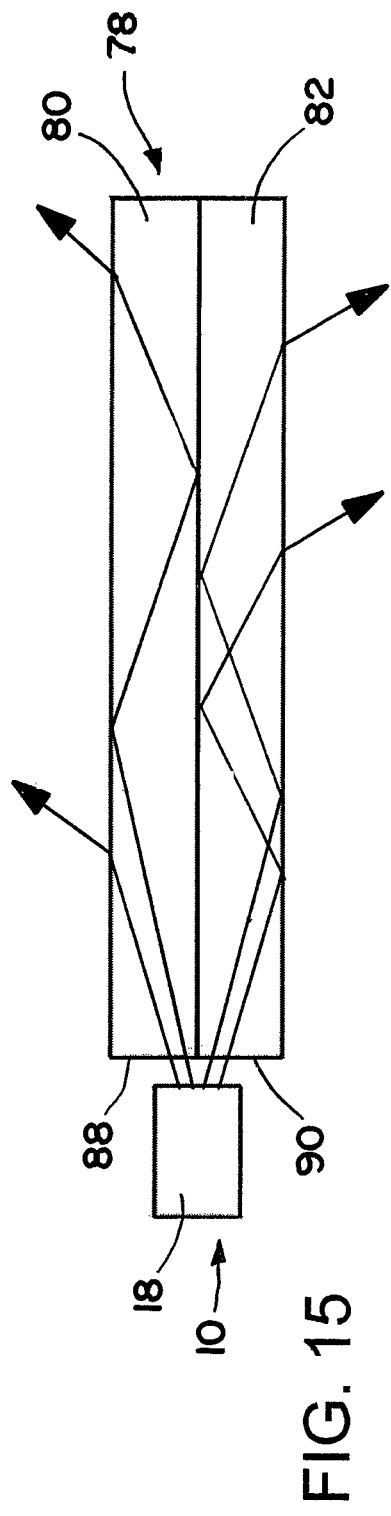
FIG. 14
FIG. 15

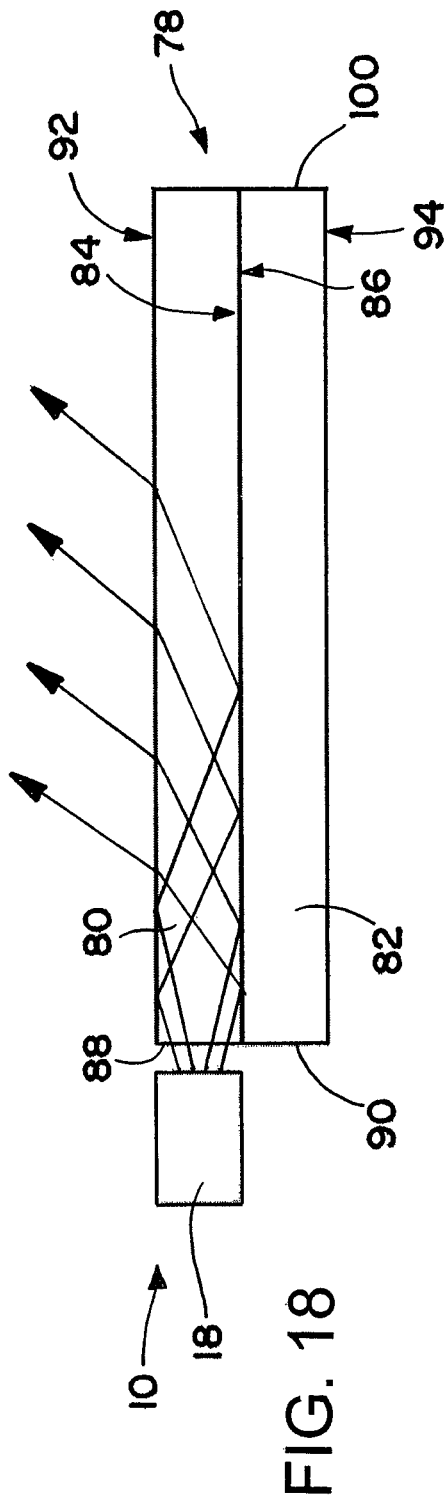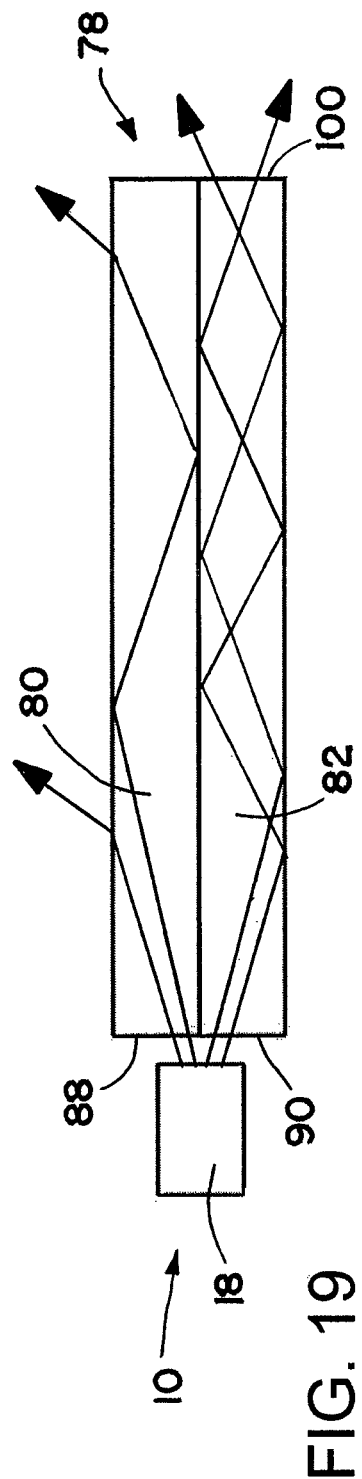

LIGHTING ASSEMBLY WITH ADJUSTABLE LIGHT OUTPUT

RELATED APPLICATION DATA

This application claims the benefit of U.S. Provisional Patent Application Nos. 61/453,756 (filed Mar. 17, 2011), 61/454,221 (filed Mar. 18, 2011), and 61/602,193 (filed Feb. 23, 2012), the disclosures of which are incorporated herein by reference in their entireties.

BACKGROUND

Energy efficiency has become an area of interest for energy consuming devices. One class of energy consuming devices is lighting devices. Light emitting diodes (LEDs) show promise as energy efficient light sources for lighting devices. But control over color and light output distribution is an issue for lighting devices that use LEDs or similar light sources.

BRIEF DESCRIPTION OF THE DRAWINGS

FIGS. 13-20 are schematic views showing part of an embodiment of a lighting assembly having adjustable light output.

DETAILED DESCRIPTION

Figure 1:
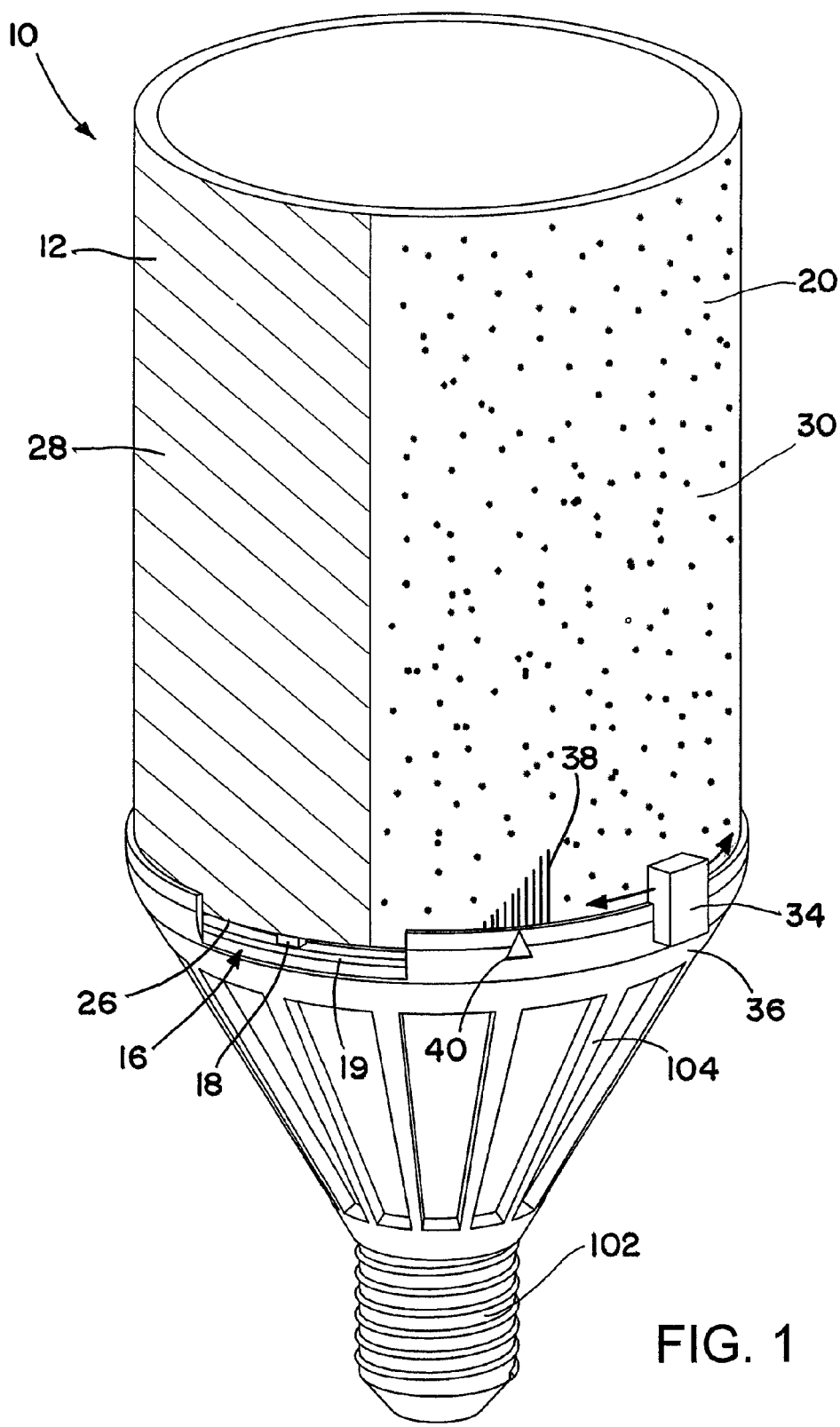
FIG. 1 is a schematic view of a light bulb representing an exemplary lighting assembly with adjustable light output, where a portion of a housing of the light bulb is cut away to show a light source assembly.

Embodiments will now be described with reference to the drawings, wherein like reference numerals are used to refer to like elements throughout. The figures are not necessarily to scale. Features that are described and/or illustrated with respect to one embodiment may be used in the same way or in a similar way in one or more other embodiments and/or in combination with or instead of the features of the other embodiments.

Figure 2:
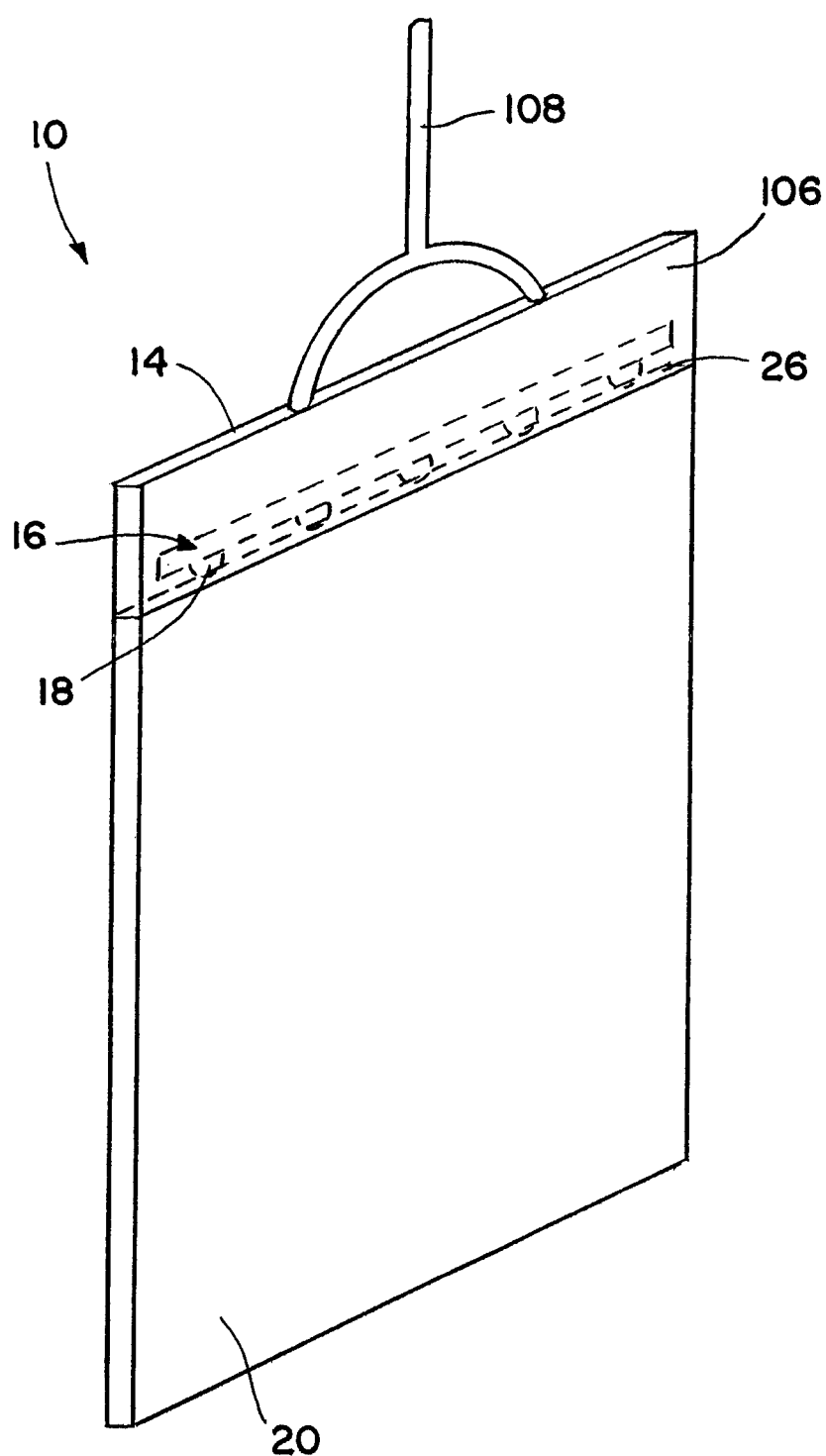
FIG. 2 is a schematic view of a lighting fixture representing another exemplary lighting assembly with adjustable light output.

Aspects of this disclosure relate to a lighting assembly. As illustrated in FIG. 1, one type of lighting assembly 10 is a light bulb 12. As illustrated in FIG. 2, another type of lighting assembly 10 is a lighting fixture 14.

As described in greater detail below, the lighting assembly includes a light guide having opposed major surfaces between which light propagates by total internal reflection, a light input edge, and two light output regions at least one of which is associated with one of the major surfaces. Each light output region is associated with a different optical characteristic. The lighting assembly also includes a light source located adjacent the light input edge to input light into the light guide. The light source and the light guide are variably positionable relative to one another to vary the location on the light input edge at which the light is input to the light guide such that the light is emitted from the light guide selectively apportioned between the light output regions. In this manner, a characteristic of the light output from the lighting assembly is modified based on the optical characteristics associated with the light output regions and the relative positioning of the light source and the light guide.

In the case of the light bulb 12, the light bulb 12 additionally includes a base configured to mechanically mount the light bulb and receive electrical power.

With additional reference to FIG. 3, the lighting assembly 10, whether a bulb 12, a lighting fixture 14, or another type of lighting device, will be described in greater detail. The lighting assembly 10 includes a light source assembly 16 (FIGS. 1 and 2). The light source assembly 16 includes one or more light sources 18. Each light source 18 is typically embodied as one or more solid-state devices. In one embodiment, the light sources 18 are mounted to a printed circuit board (PCB) 19 (FIG. 1).

Exemplary light sources 18 include solid state devices such as LEDs, laser diodes, and organic LEDs (OLEDs). In an embodiment where the light source 18 is one or more LEDs, the LEDs may be top-fire LEDs or side-fire LEDs, and may be broad spectrum LEDs (e.g., emit white light) or LEDs that emit light of a desired color or spectrum (e.g., red light, green light, blue light, or ultraviolet light). In one embodiment, the light source 18 emits light with no operably-effective intensity at wavelengths greater than 500 nanometers (nm) (i.e., the light source 18 emits light at wavelengths that are predominantly less than 500 nm). Although not specifically illustrated, the light source assembly 16 also includes structural components (e.g., PCB 19) to retain the light sources 18. The light source assembly 16 may additionally include: circuitry, power supply and/or electronics for controlling and driving the light sources 18, a heat sink, and any other appropriate components.

Figure 7:
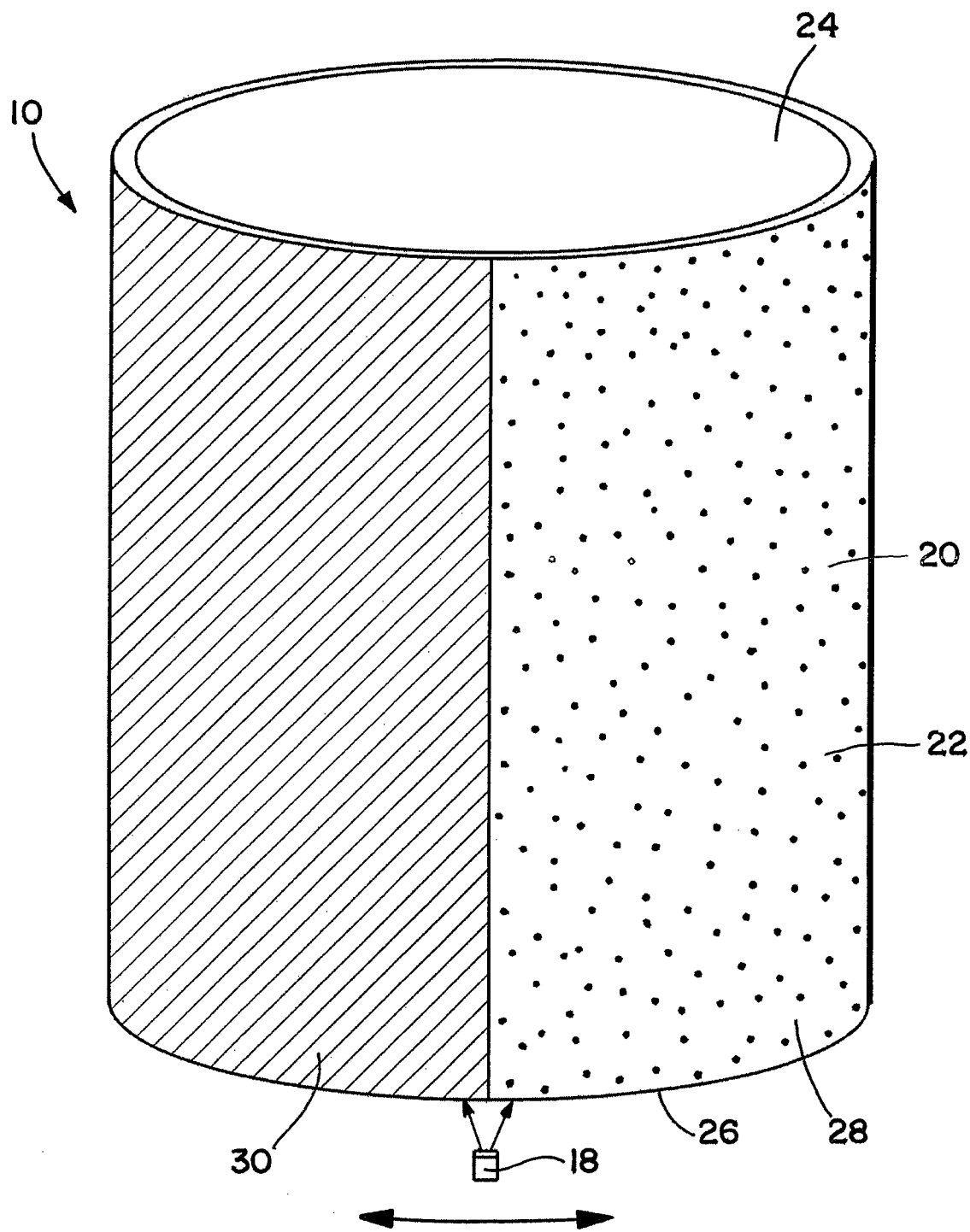
FIG. 7 is a schematic view showing part of an embodiment of a lighting assembly having adjustable light output.

The lighting assembly 10 also includes a light guide 20. Light from the light sources 18 is input into the light guide 20. The light guide 20 is a solid article made from, for example, acrylic, polycarbonate, glass, or another appropriate material. The light guide 20 also may be a multi-layer light guide having two or more layers. The light guide 20 has opposed major surfaces 22 and 24. Depending on the configuration of the light guide 20, the light guide has at least one edge. For instance, in a case where the light guide 20 is shaped like a dome, the light guide has one edge. In a case where the light guide 20 is a hollow cylinder (e.g., as shown in FIGS. 1 and 7), is frustroconical, is a frustrated pyramid, is a dome with a hole cut at the dome's apex, or another similar shape, the light guide has two opposed edges. Other light guide 20 shapes for either a light bulb 12 or a lighting fixture 14 are possible, such as a globe or a shape approximating the bulbous shape of a conventional incandescent bulb. In one embodiment, a light bulb configuration or a lighting fixture configuration may be established using planar or curved light guides 20 that are arranged in a three-dimensional geometric (e.g., polygonal) configuration. In the case where the light guide 20 is rectangular (e.g., as shown in FIGS. 2 and 3), the light guide 20 has four edges. Other geometries for the light guide 20 result in a corresponding number of edges. Depending on the geometry of the light guide 20, each edge may follow a straight path or a curved path, and adjacent edges may meet at a vertex or join in a curve.

Figure 6:
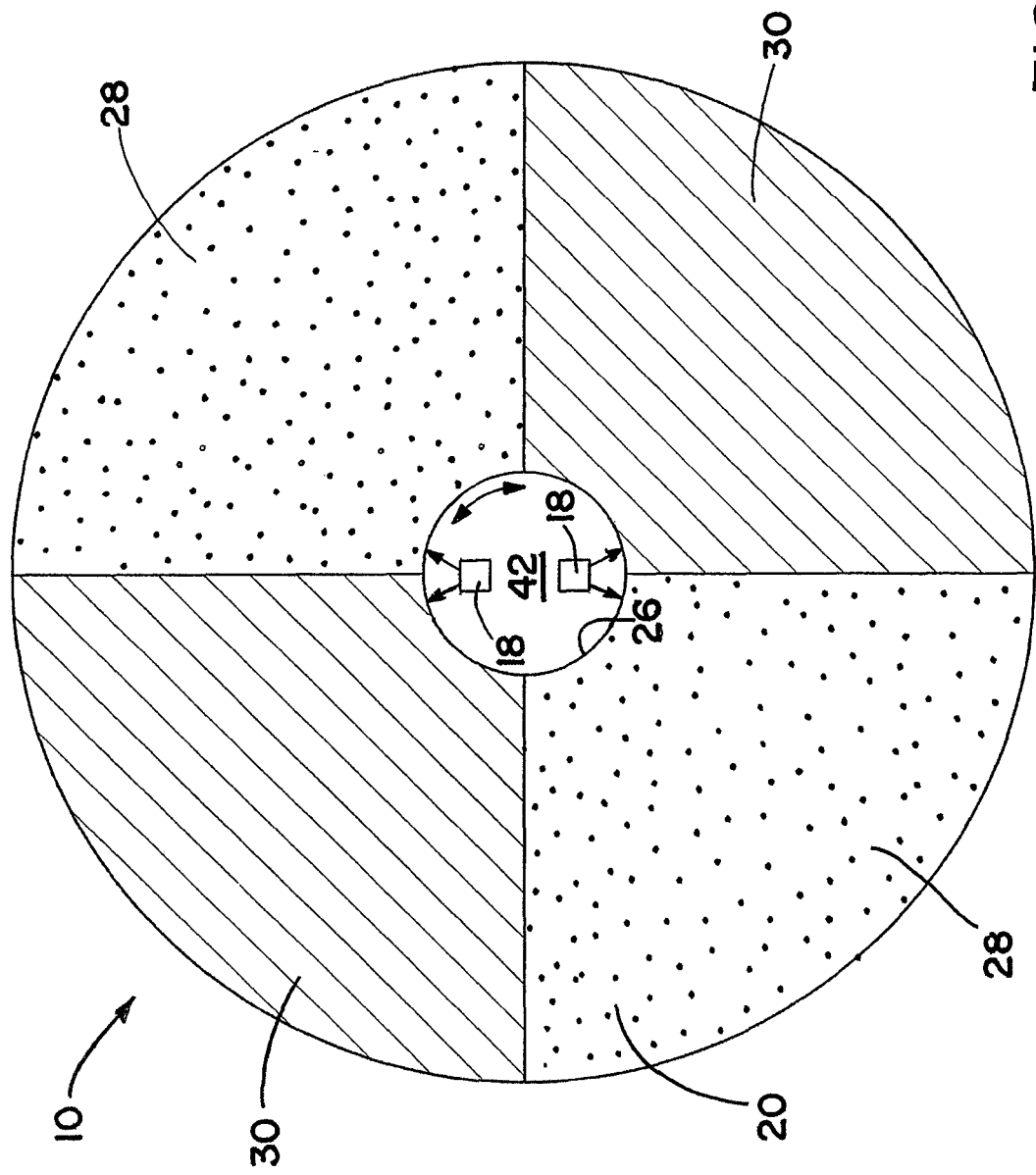
FIG. 6 is a schematic view showing part of an embodiment of a lighting assembly having adjustable light output.

One of the edges serves as a light input edge 26. In some embodiments, the light input edge 26 is an external edge of the light guide 20 (e.g., as shown in FIGS. 1 and 2). In embodiments, the light input edge 26 is an internal edge of the light guide 20, which is an edge completely surrounded by the light guide 20 and is usually an edge of a hole 42 that extends between the major surfaces of the light guide 20 (e.g., as shown in FIG. 6). Light output from the light sources 18 is directed toward the light input edge 26. Additional optical elements (e.g., lenses, reflectors, etc.) may be present to assist in inputting the light into the light guide 20. Once input into the light guide 20, the light propagates through the light guide by total internal reflection (TIR) at the opposed major surfaces 22, 24. For purposes of this disclosure, any light input surface of the light guide 20 is considered a light input edge, even if it is located on one of the major surfaces 22, 24 or forms part of a light turning and/or homogenizing structure to introduce light between the major surfaces 22, 24 in a manner that allows the light to propagate along the light guide 20 by total internal reflection at the major surfaces 22, 24.

Length and width dimensions of each of the major surfaces 22, 24 are much greater than, typically ten or more times greater than, the thickness of the light guide 20. For instance, in the rectangular embodiment shown in FIG. 2, the length (measured from the light input edge 26 to an opposite edge distal the light input edge 26) and the width (measured along the light input edge 26) of the light guide 20 are both much greater than the thickness of the light guide 20. The thickness is the dimension of the light guide 20 in a direction orthogonal to the major surfaces. The thickness of the light guide 20 may be, for example, about 0.1 millimeters (mm) to about 10 mm. The light guide 20 may be rigid or flexible.

The light guide 20 includes light extracting elements in or on at least one of the major surfaces 22, 24. Light extracting elements that are in or on a major surface 22, 24 will be referred to as being "at" the major surface 22, 24. Each light extracting element functions to disrupt the total internal reflection of the propagating light that is incident on the light extracting element. In one embodiment, the light extracting elements reflect light toward the opposing major surface so that the light exits the light guide 20 through the opposing major surface. Alternatively, the light extracting elements transmit light through the light extracting elements and out of the major surface 22, 24 of the light guide 20 having the light extracting elements. In another embodiment, both of these types of light extracting elements are present. In yet another embodiment, the light extracting elements reflect some of the light and refract the remainder of the light incident thereon. Therefore, the light extracting elements are configured to extract light from one or both of the major surfaces 22, 24.

Light extracting elements are arranged at a major surface 22, 24 to extract light from one or more distinct light output regions 28, 30 of one or both of the major surfaces 22, 24. It is possible that a light output region occupies part or all of one of the major surfaces 22, 24.

The location of the light source 18 relative to the light guide 20, the angular range 32 of light output from the light source 18, and the configuration of the light extracting elements determine the portion of the light that exits through each light output region 28, 30. The light extracting elements for each light output region may be at one or both of the major surfaces 22, 24 through which light is emitted, or at the opposite major surface 22, 24. Light guides having such light extracting elements are typically formed by a process such as stamping, molding, embossing, extruding, laser etching, chemical etching, or another suitable process. Light extracting elements may also be produced by depositing elements of curable material on the light guide 20 and curing the deposited material using heat, UV-light or other radiation. The curable material can be deposited by a process such as printing, ink jet printing, screen printing, or another suitable process. Alternatively, the light extracting elements may be inside the light guide between the major surfaces 22, 24 (e.g., the light extracting elements may be light redirecting particles and/or voids disposed in the light guide).

The light extracting elements are configured to extract light in a defined intensity profile, such as uniform intensity, and/or a defined light ray angle distribution over the light output region. Using variations in the light extracting elements, each light output region need not have the same intensity profile and/or light ray angle distribution. Intensity profile refers to the variation of intensity with position within a light-emitting region (such as light output region 28 or light output region 30). Light ray angle distribution refers to the variation of intensity with ray angle (typically a solid angle) of light emitted from a light-emitting region (such as light output region 28 or light output region 30).

Exemplary light extracting elements include light-scattering elements, which are typically features of indistinct shape or surface texture, such as printed features, ink jet printed features, selectively-deposited features, chemically etched features, laser etched features, and so forth. Other exemplary light extracting elements include features of well-defined shape, such as V-grooves, lenticular grooves, and features of well-defined shape that are small relative to the linear dimensions of the major surfaces 22, 24, which are sometimes referred to as micro-optical elements. The smaller of the length and width of a micro-optical element is less than one-tenth of the longer of the length and width of the light guide 20, and the larger of the length and width of the micro-optical element is less than one-half of the smaller of the length and width of the light guide. The length and width of the micro-optical element is measured in a plane parallel to the major surface 22, 24 of the light guide 20 for flat light guides 20 or along a surface contour for non-flat light guides 20.

Micro-optical elements are shaped to predictably reflect light or predictably refract light. However, one or more of the surfaces of the micro-optical elements may be modified, such as roughened, to produce a secondary effect on light output. Exemplary micro-optical elements are described in U.S. Pat. No. 6,752,505 and, for the sake of brevity, will not be described in detail in this disclosure. The micro-optical elements may vary in one or more of size, shape, depth or height, density, orientation, slope angle, or index of refraction such that a desired light output from the light guide 20 is achieved over the corresponding light output region 28.

Figure 3:
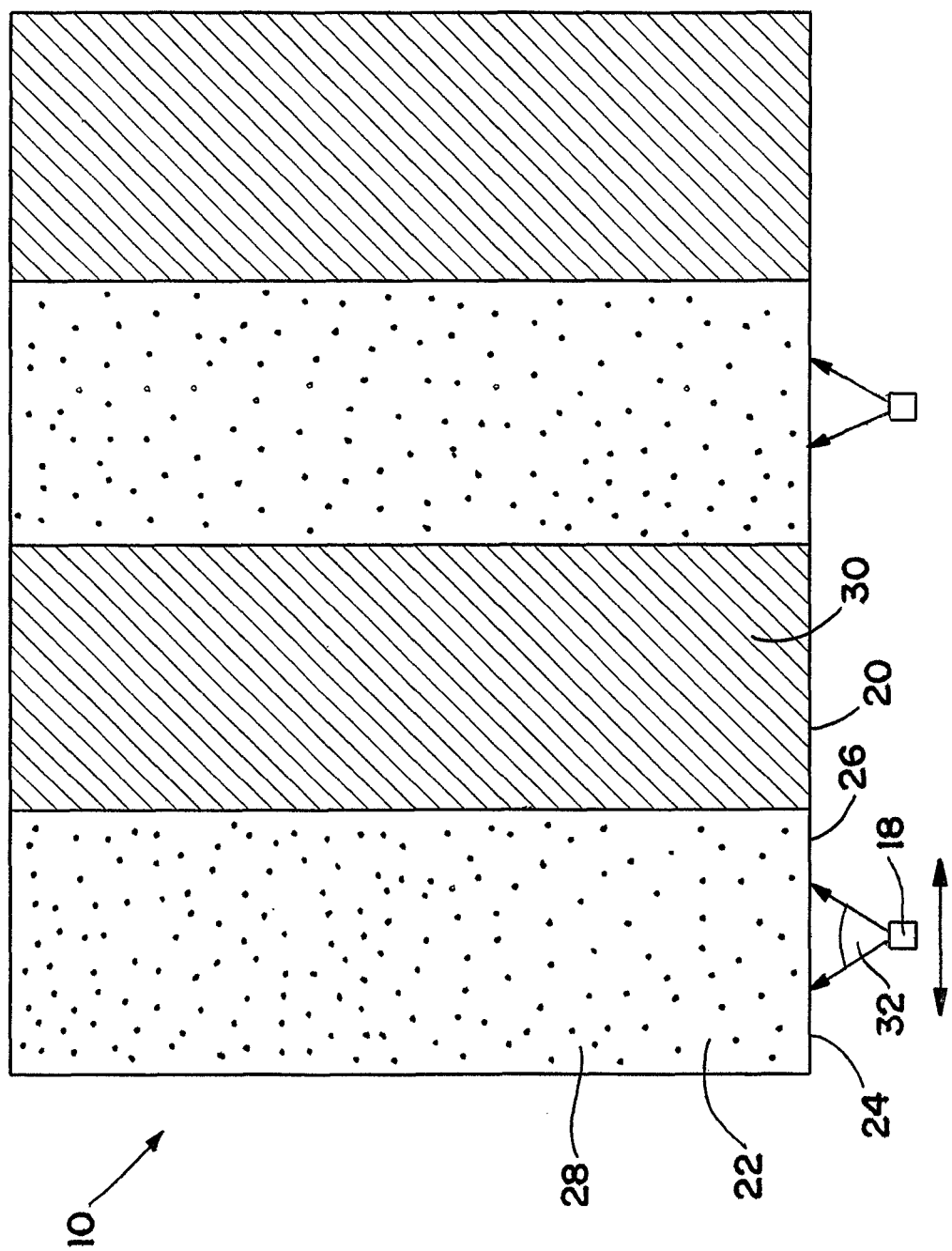
FIGS. 3-5 are schematic views showing part of an embodiment of a lighting assembly having adjustable light output.
Figure 4:
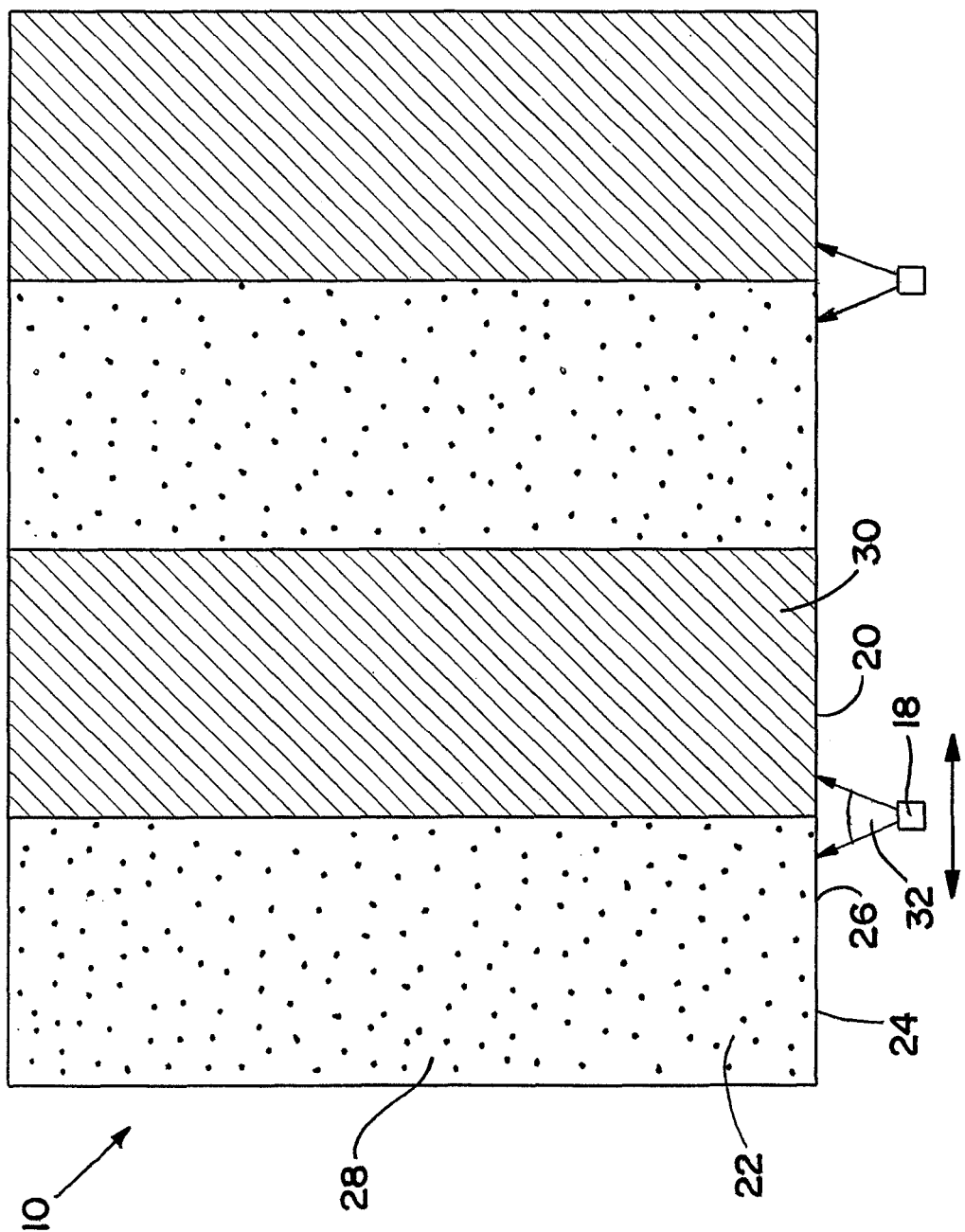
Figure 5:
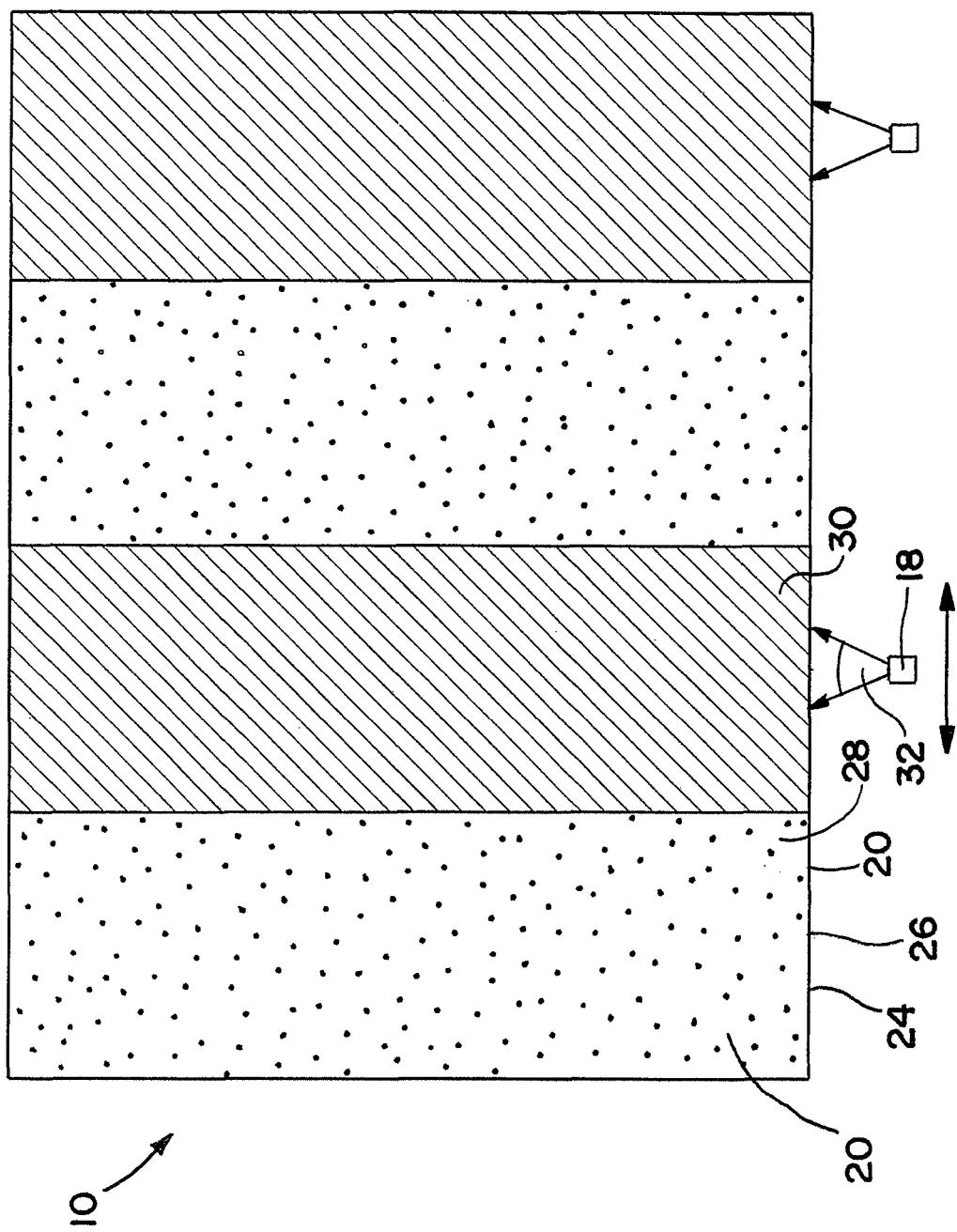

FIGS. 3-5 schematically illustrate one embodiment of components of the lighting assembly 10 that are operative to modify a characteristic of the light output of the lighting assembly 10. In this embodiment, the light guide 20 has a first light output region 28 and a second light output region 30. As illustrated, there are more than one first light output region 28 and more than one second light output region 30. In embodiments where there are more than one set of two or more light output regions, each set of light output regions is associated with a respective light source 18. The light source 18 has an angular range 32, which is the range of light ray angles within which a predominant amount of the light is emitted by the light source.

The first light output region 28 has an optical characteristic that is different than an optical characteristic of the second light output region 30. The optical characteristics in the embodiment of FIGS. 3-5 are each provided by a material property of the region 28, 30 or optical characteristic-affecting structure of the region 28, 30. The different optical characteristics are indicated by different types of surface hatching in the appended figures. The different optical characteristics may be two different types of optical characteristic or different amounts of the same type of optical characteristic. Exemplary optical characteristics of the light output regions 28, 30 include specularly transmissive, reflective, diffusive, light redirecting, polarizing, reflective polarizing, intensity reducing, wavelength shifting and color attenuating. Wavelength shifting is used herein to refer to a process in which a material absorbs light at certain wavelengths, and reemits the light at one or more different wavelengths. Wavelength shifting may be achieved using a phosphor material, a luminescent material, a luminescent nanomaterial such as a quantum dot material, a conjugated polymer material, an organic fluorescent dye, an organic phosphorescent dye, lanthanide-doped garnet, or the like. Color attenuating may be achieved using color filtering material.

In the illustrated embodiments, the change in optical characteristic from the first light output region 28 to the second light output region 30 is abrupt. In an embodiment, a barrier (not shown) is provided between the first light output region 28 and the second light output region 30 to reduce light leakage between the output regions. In an example, a groove extending into the light guide 20 from one or both major surfaces 22, 24 at the boundary between the output regions serves as the barrier. Reflective or opaque material may be located in the groove. For example, the groove walls may be coated with reflective material. In other embodiments, the transition between the first region 28 and the second region 30 is gradual. A gradual transition may be appropriate where at least one of the regions 28, 30 has an optical characteristic related to intensity reducing, wavelength shifting or color attenuating, but also may be used in other situations. The effect that the light output regions 28, 30 have on light that is output from the lighting assembly 10 will be described in greater detail below.

Each set of light output regions, e.g., light output regions 28, 30, has at least one light source 18 to generate light that is output through the light output regions 28, 30 in amounts apportioned between the light output regions 28, 30 dependent on the relative positioning of the light guide 20 and the light source 18. More specifically, one or both of the light guide 20 and the light source 18 is variably positionable relative to the other. The location at which the light from light source 18 is input to the light guide 20 determines where the light exits the light guide 20. For example, in FIG. 3, the light source 18 is located adjacent the light input edge 26 in an area of the light input edge 26 corresponding to the first light output region 28. Therefore, more of the light from the light source 18 exits the light guide 20 by way of the first light output region 28 than exits by way of the second light output region 30.

In the examples shown in FIGS. 4 and 5, the light source 18 has been moved laterally by respective distances relative to the position shown in FIG. 3 to change the position of the light source 18 relative to the light guide 20 and produce a corresponding change in the portion of the light from the light source 18 that exits the first output region 28 and, correspondingly, the portion of the light from the light source 18 that exits the second output region 30. In another example (not shown), light guide 20 is moved laterally to change its position relative to the light source 18 to produce a similar effect. In one embodiment, and as shown in FIG. 3, the relative positioning is varied so that more of the light emitted from the light source 18 exits the first light output region 28 than exits the second light output region 30. Also, as shown in FIG. 5, the relative positioning is varied so that more of the light that is emitted from the light source 18 exits the light guide by way of the second light output region 30 than exits the light guide by way of the first light output region 28. Also, as shown in FIG. 4, the relative positioning is varied so that similar portions of the light from the light source 18 exit the first light output region 28 and the second light output region 30. Locating a barrier between the first light output region 28 and the second light output region 30, as described above, increases the ratio between the amount of the light that exits the light guide by way of the first light output region 28 and that which exits the light guide by way of the second light output region 30 in the example shown in FIG. 3, and vice versa in the example shown in FIG. 5.

The variable relative positioning illustrated in FIGS. 3-5 allows for selectively apportioning light that is output from the lighting assembly 10 between the light that is output by way of the first light output region 28 and the light that is output by way of the second light output region 30. The light output by way of the first light output region 28 is modified by the optical characteristic of the first light output region 28 and the light output by way of the second light output region 30 is modified by the optical characteristic of the second light output region 30. Therefore, the overall characteristic of the light output from the lighting assembly 10 is modified based on the optical characteristics associated with the light output regions and the relative positioning of the light source 18 and the light guide 20.

In one embodiment, the relative positioning is varied manually by a user. In the example shown in FIG. 1, the lighting assembly 10 includes a user-manipulable mechanism 34 that moves one or both of the light guide 20 and the light source 18 relative to the other to vary the relative positioning of the light guide 20 and the light source 18. As shown in FIG. 1, the light source 18 is fixed relative to a housing 36 and the light guide 20 is rotatably moveable relative thereto by the manual application of force to the mechanism 34. In the embodiment of FIG. 1, the mechanism 34 is a member that is secured to the light guide 20 and slides over a portion of the housing 36 of the light bulb 12. In one embodiment, the amount of movement is limited by stops (not illustrated). Other manually-operated mechanisms are possible. For instance, other types of sliders may be employed or a turnable knob may act on the moveable component through a gear or drive train. In other embodiments, the mechanism 34 is motorized to move one or both of the light guide 20 and the light source 18 relative to the other. The motorized mechanism may be controlled by a control assembly (not shown) to adjust light output based on user input, feedback from sensors, or a triggering event. In still other embodiments, there is no mechanism 34 and the adjustment is made by applying a positioning force, which in the case of the exemplary cylinder is torque, directly to the moveable one of the light source assembly 16 and the light guide 20.

Once positioned, the relative positioning of the light guide 20 and the light source 18 remains unchanged until the user or control assembly varies the relative positioning. Since constant motion of the light guide 20 relative to the light source 18 is not contemplated during operation of the lighting assembly 10, the range of movement of the light guide 20 and/or the light source 18 may be limited. The range of movement may be limited to back-and-forth sliding that moves the regions 28, 30 in and out of alignment with the light source 18, rather than allowing infinite movement of the light guide 20 or the light source 18 in one direction.

A visual indicator may be present to provide the user with an indication of the characteristic of the light output by the lighting assembly 10. In the illustrated embodiment of FIG. 1, for example, markings 38 are present on the light guide 20 and align relative to a pointer 40 on the housing to provide this indication.

With additional reference to FIG. 6, schematically illustrated is another embodiment of part of the lighting assembly 10 having an adjustable light output. In this embodiment, a disk-shaped light guide 20 has two sets of two light output regions 28, 30. The light output regions 28, 30 have different optical characteristics. The light guide has a hole 42 that extends between the major surfaces 22, 24 of the light guide 20, typically at its center. The edge of the hole 48 provides the light input edge 26 of the light guide 20 in this embodiment. Light from each light source 18 is input to light guide 20 through the light input edge 26. The variable relative positioning of the light guide 20 and the light sources 18 selectively apportions the light emitted by each light source 18 between the light output and modified by the first light output region 28 and the light output and modified by the second light output region 30.

With additional reference to FIG. 7, schematically illustrated is another embodiment of part of the lighting assembly 10 having an adjustable light output. In this embodiment, a hollow cylindrical light guide 20 has the two light output regions 28, 30 having different optical characteristics. Light is input through the light input edge 26, which is an edge along one end of the light guide 20. The variable relative positioning of the light guide 20 and the light source 18 selectively apportions light between the light output and modified by the first light output region 28 and the light output and modified by the second light output region 30.

Figure 8:
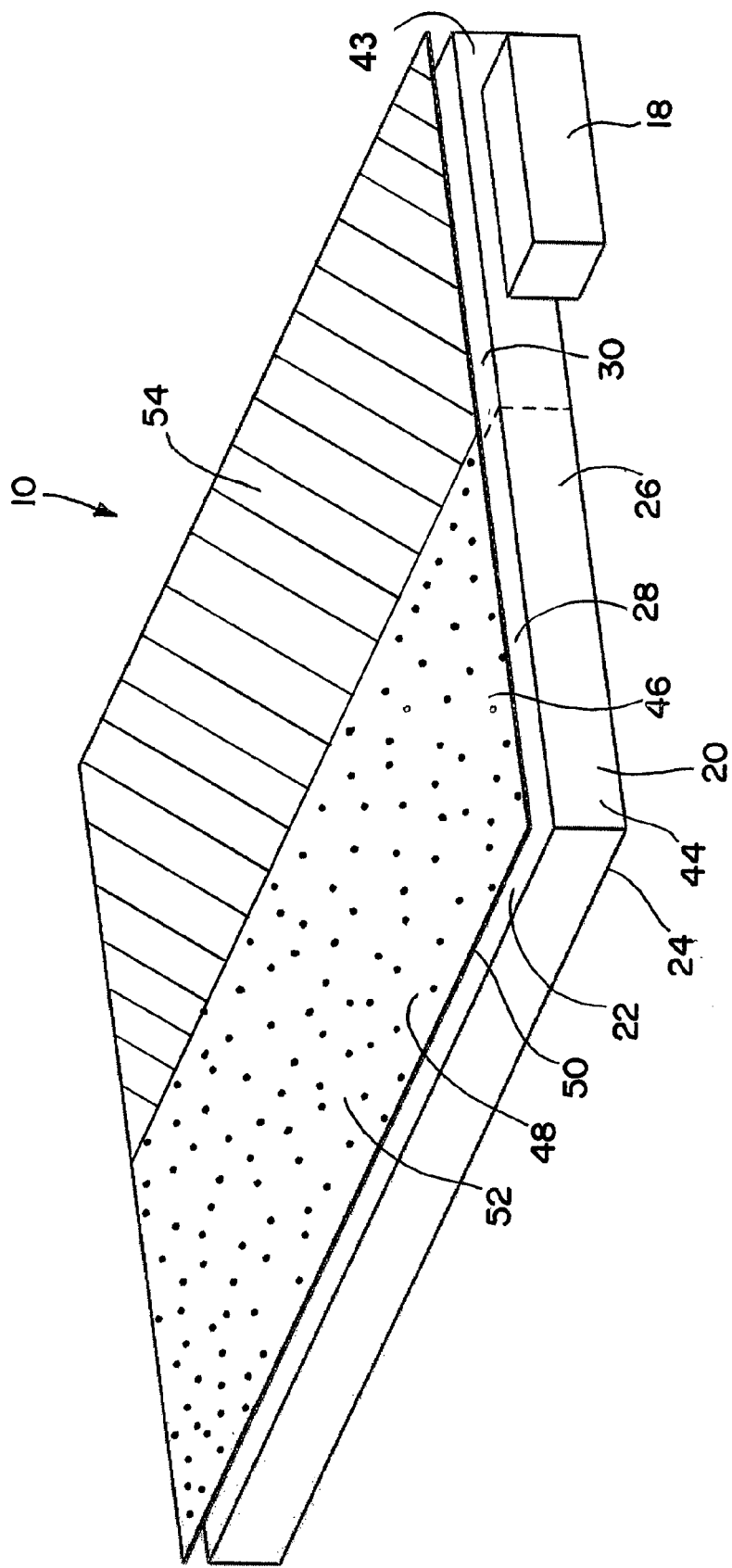
FIGS. 8-10 are schematic views showing part of an embodiment of a lighting assembly having adjustable light output.
Figure 9:
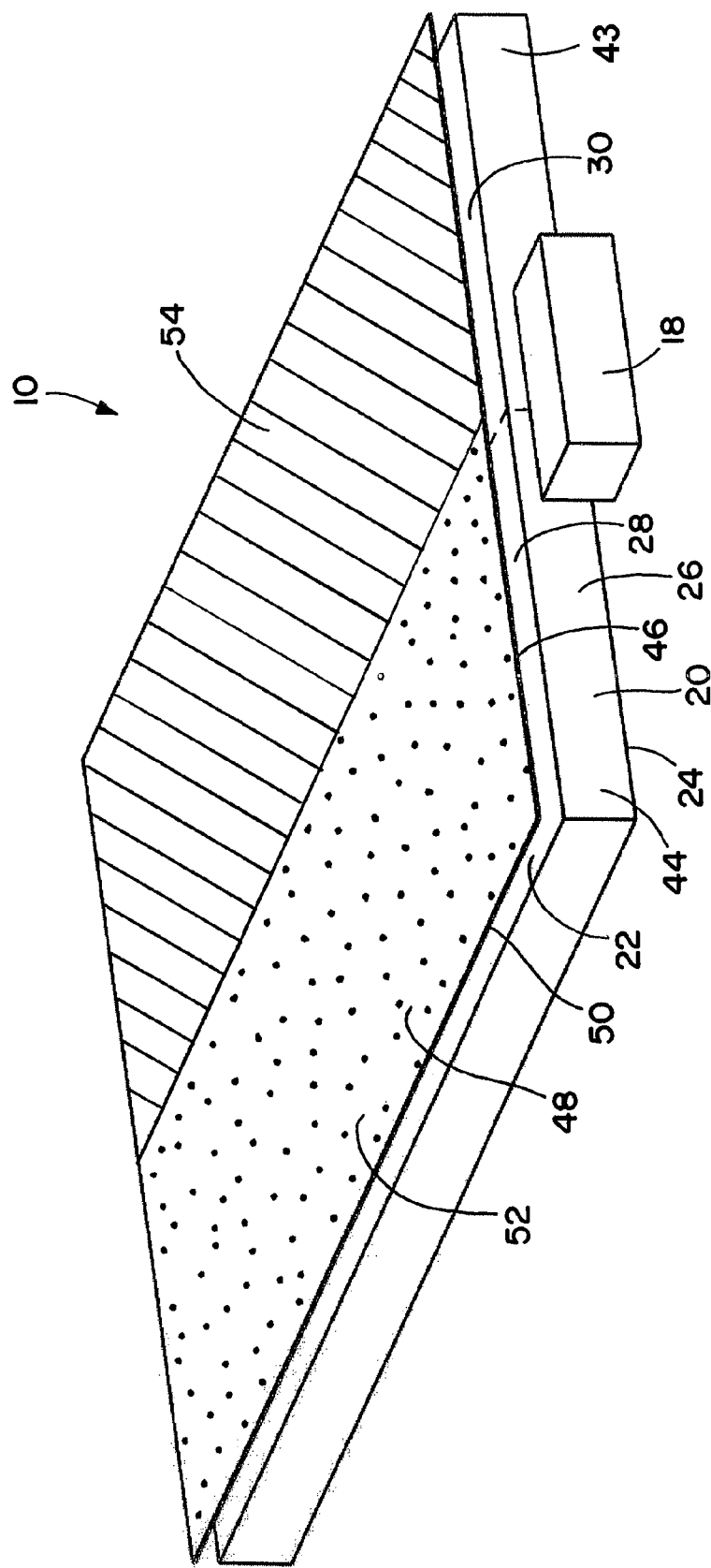
Figure 10:
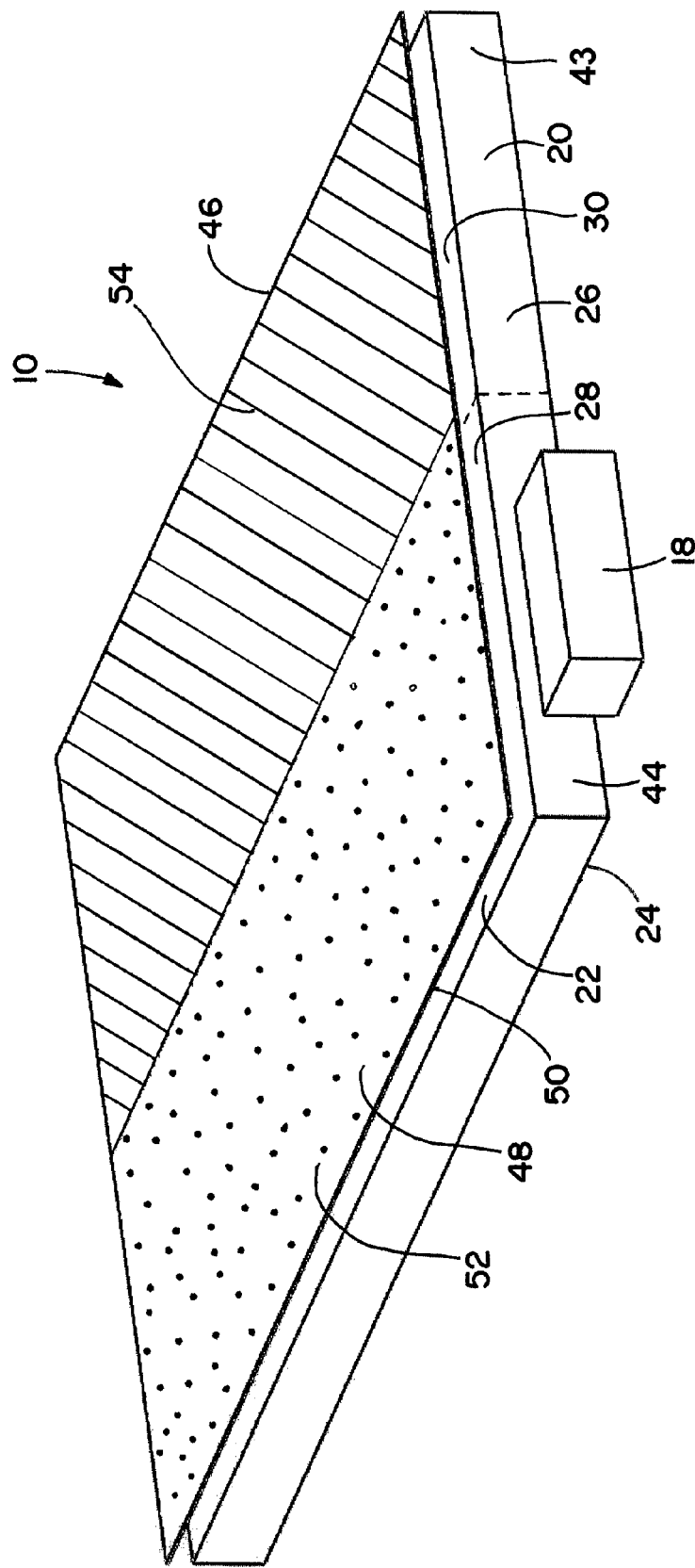

With additional reference to FIGS. 8-10, schematically illustrated is another embodiment of part of the lighting assembly 10 having an adjustable light output. In this embodiment, the light output regions of the light guide 20 do not have different optical characteristics (e.g., there may be no discernable differences in the light guide 20 to form distinct regions), but the area of the light guide 20 that outputs light depends on the variable relative positioning of light source 18 and the light guide 20. Typically, the area that outputs light is aligned with the light source 18. For instance, using the respective relative positions shown in the FIGS. 8-10, when the light source 18 is positioned to the right 43 of the light input edge 26, as shown in FIG. 8, more of the light exits through the second light output region 30 of light guide 20 than through the first light output region 28. Following this example, when the light source 18 is positioned near the middle of the light input edge 26, as shown in FIG. 9, the light is apportioned approximately equally between first light output region 28 and second output region 30 with the apportionment depending on the relative positioning of the light source 18 and light guide 20. When the light source 18 is positioned to the left 44 of the light input edge 26, as shown in FIG. 10, more of the light exits through the first light output region 28 of the light guide 20 than through the second light output region 30. In a manner similar to that described above, a barrier (not shown) may be used to define optically-isolated light output regions 28, 30 in the light guide 20.

In the embodiments of FIGS. 8-10, to achieve the desired modification of the light output based on the relative positioning of the light source 18 and the light guide 20, the lighting assembly 10 further includes an optical adjuster 46. The optical adjuster 46 has a fixed position relative to the light guide 20. The optical adjuster 46 has opposed major surfaces 48 and 50. In the illustrated embodiment, the major surface 50 of the optical adjuster 46 is juxtaposed with the major surface 22 of the light guide 20 and conforms to the surface contour of the light guide 20. The major surface 50 of the optical adjuster 46 that faces the light guide 20 is separated from major surface 22 so that the optical adjuster 46 does not disrupt the total internal reflection within the light guide 20. In the embodiment where the light guide 20 is planar (e.g., as shown in FIGS. 8-10), the optical adjuster 46 is planar and located adjacent the major surface 22. The optical adjuster 46 is located such that at least a portion of the light output from the light guide 20 is incident thereon. In another embodiment in which the light guide 20 is configured as a hollow cylinder, such as is shown in FIG. 1, the optical adjuster 46 is also a hollow cylinder and positioned either inside the light guide 20 or outside the light guide 20, and is coaxial therewith.

The optical adjuster 46 has two or more optical adjuster regions. In the embodiment of FIGS. 8-10, for example, the optical adjuster 46 has a first optical adjuster region 52 and a second optical adjuster region 54. The first optical adjuster region 52 has an optical characteristic that is different than an optical characteristic of the second optical adjuster region 54. The different optical characteristics are denoted by the surface hatching in the appended figures. The different optical characteristics may be two different types of optical characteristic or different amounts of the same type of optical characteristic. In the illustrated embodiments, the change in optical characteristic from the first optical adjuster region 52 to the second optical adjuster region 54 is abrupt. In other embodiments, the transition between the regions 52, 54 may be gradual.

The optical adjuster region 52 of the optical adjuster 46 is aligned with the first light output region 28 of the light guide 20 and is, therefore, associated with the first light output region 28. Similarly, the optical adjuster region 54 the optical adjuster 46 is aligned with the second light output region 30 of the light guide 20 and is, therefore, associated with the second light output region 30. The optical characteristics of the optical adjuster regions combine with the optical characteristics of the respective light output regions with which they are associated to modify the characteristics of the light output of the lighting assembly 10. Examples of the characteristics of the light output modified by the optical characteristics of the light output regions are intensity profile, light ray angle distribution, spectrum, polarization, and coherence.

Light output from the major surface 22 of light guide 20 is incident on the optical adjuster 46. Depending on the relative positioning of the light source 18 and the light guide 20, the light incident on the optical adjuster 46 is modified by the optical characteristic of the first optical adjuster region 52 and/or is modified by the optical characteristic of the second optical adjuster region 54. As shown in FIG. 10, when the position of the light source 18 relative to the light guide 20 is such that more of the light from the light source 18 is output from the first light output region 28 of the light guide 20 than is output from the second light output region 30 of the light guide 20, more of the light that is emitted from the light guide 20 is incident on the first optical adjuster region 52 and is modified by the optical characteristic thereof than is incident on the second optical adjuster region 54 and is modified by the optical characteristic thereof. As shown in FIG. 8, when the position of the light source 18 relative to the light guide 20 is such that more of the light from the light source 18 is output from the second light output region 30 of the light guide 20 than is output from the first light output region 28 of the light guide, more of the light that is emitted from the light guide 20 is incident on the second optical adjuster region 54 and is modified by the optical characteristic thereof than is incident on the first optical adjuster region 52 and is modified by the optical characteristic thereof. Also, as shown in FIG. 9, when light output by the light guide 20 and incident on the optical adjuster 46 is apportioned between a portion of the first optical adjuster region 52 and a portion of the second optical adjuster region 54, the light is proportionally modified by the optical characteristics of the first optical adjuster region 52 and the second optical adjuster region 54. In this manner, a characteristic of the light output from the lighting assembly 10 is modified based on the respective effects of the optical adjuster regions 52, 54 on the light, which depend on the apportionment of the light between the optical adjuster regions 52, 54. The apportionment in turn depends on the relative positioning of the light source 18 and the light guide 20.

In a variation of this embodiment, the light output regions 28, 30 each have different optical characteristics. In this variation, the first light output region 28 is aligned with the first optical adjuster region 52 and the second light output region 30 is aligned with the second optical adjuster region 54, as illustrated. Alternatively, a portion of the second optical adjuster region 54 may overlap with the first light output region 28 or a portion of the first optical adjuster region 52 may overlap with the second light output region 30. In these variations, the light output from the light guide 20 is initially modified by the optical characteristic of the one or more of the first or second light output region 28, 30 through which the light passes and is further modified by the optical characteristic of the one or more of the first or second optical adjuster region 52, 54 through which the light passes.

One or more additional optical adjusters may be located between the optical adjuster 46 and the light guide 20. One or more additional optical adjusters may be located adjacent the major surface 48 of the optical adjuster 46 that faces away from the light guide 20. If present, each additional adjuster may have a single optical characteristic or multiple optical characteristics.

Figure 11:
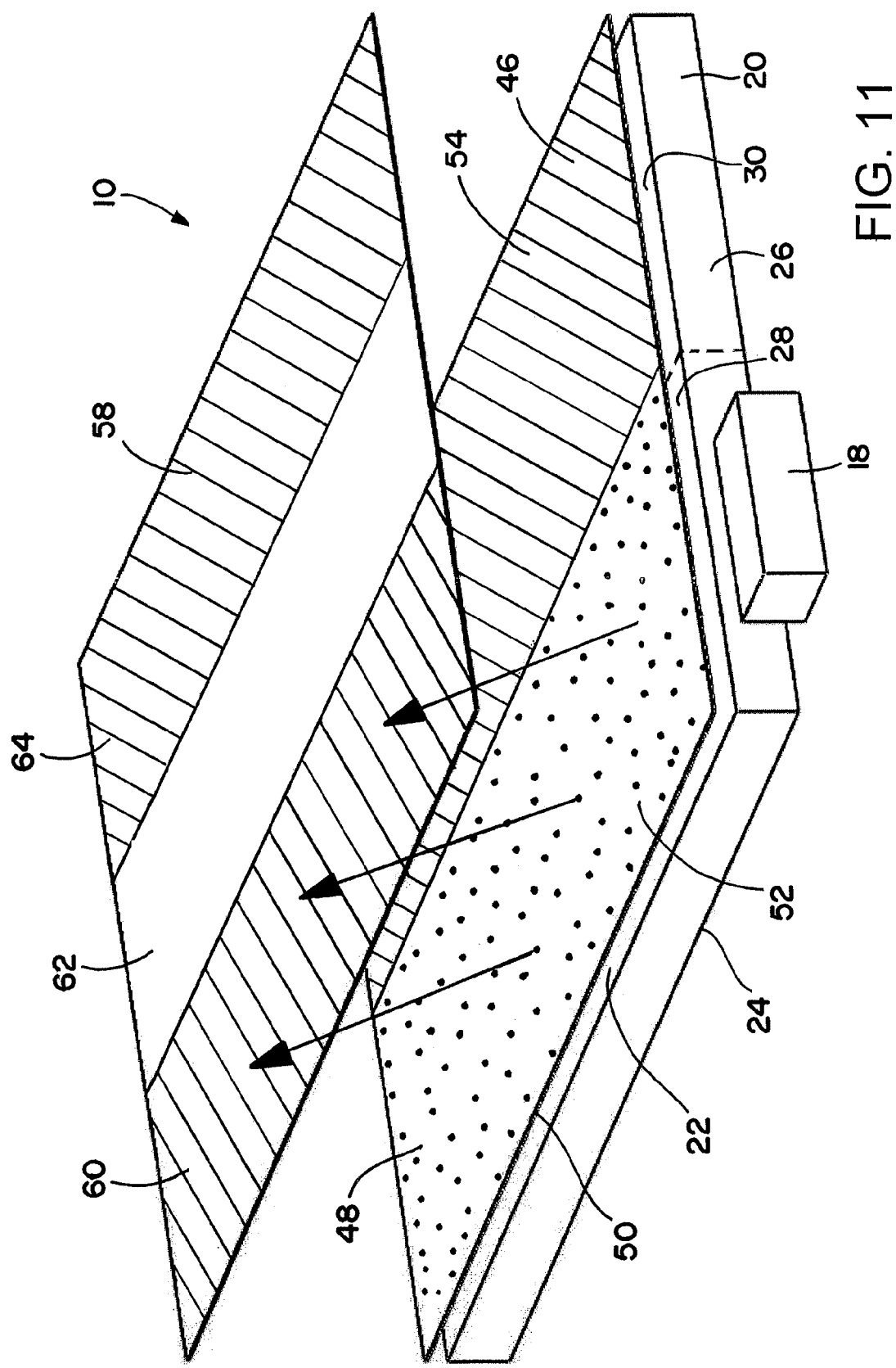
FIG. 11 is a schematic view showing part of an embodiment of a lighting assembly having adjustable light output.

As illustrated in FIG. 11, an additional optical adjuster 58 is located adjacent the optical adjuster 46. The additional optical adjuster 58 of the illustrated embodiment is superposed with the optical adjuster 46 and has three optical adjuster regions 60, 62 and 64, each of which has a respective optical characteristic to further modify light output by the lighting assembly 10. Like the optical adjuster 46, the additional optical adjuster 58 has a fixed position relative to the light guide 20. In another embodiment, the additional optical adjuster 58 and the light guide 20 are variably positionable relative to one another. The light output from the light guide 20 is modified by various combinations of the adjuster regions of the optical adjusters 46, 58 depending on the variable relative positioning of the light source 18 and the light guide 20, and additionally depending on the variable relative positioning of the additional optical adjuster 58 and the light guide 20 in embodiments in which this feature is implemented.

Figure 12:
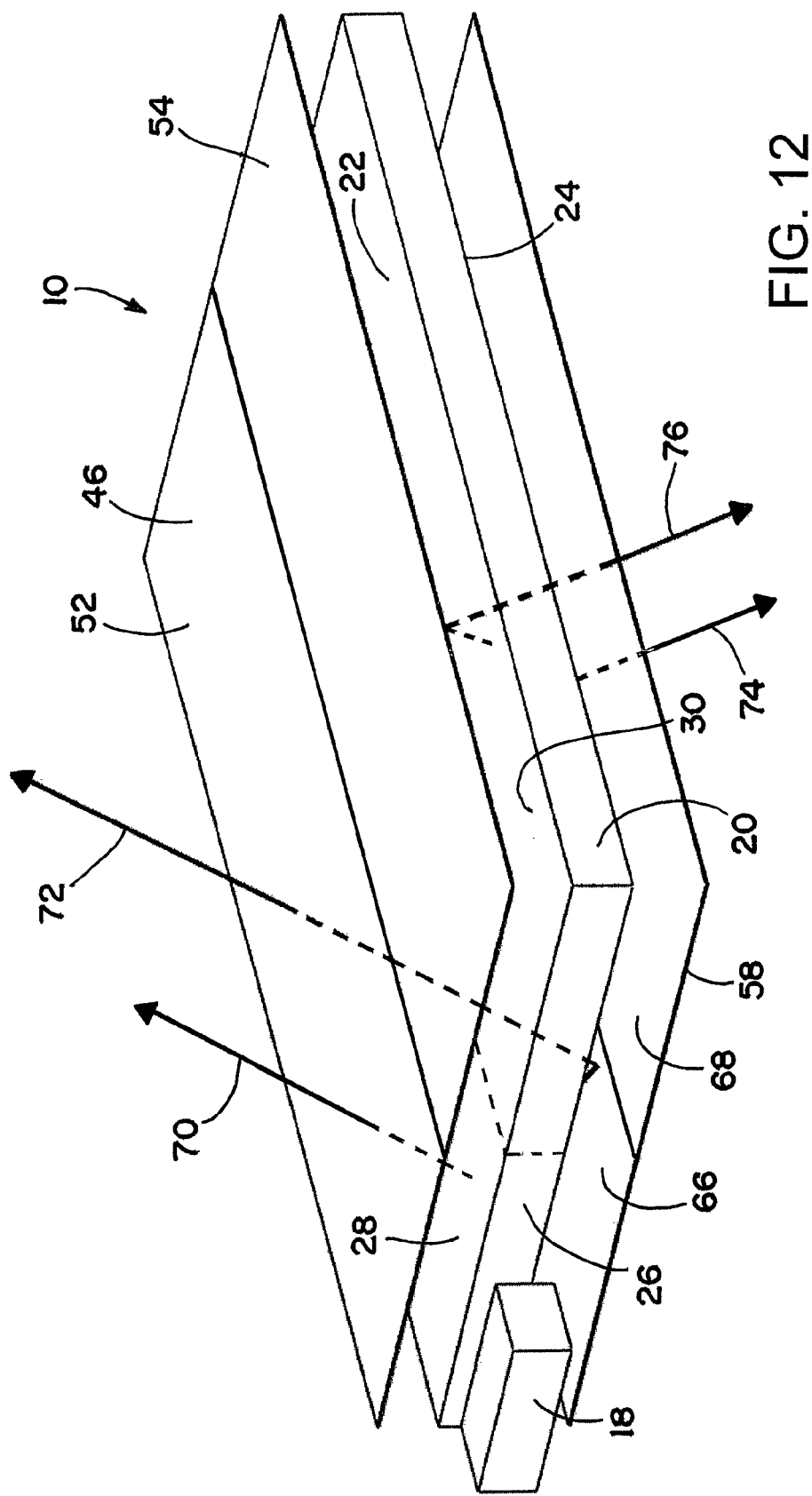
FIG. 12 is a schematic view showing part of an embodiment of a lighting assembly having adjustable light output.
Figure 13:
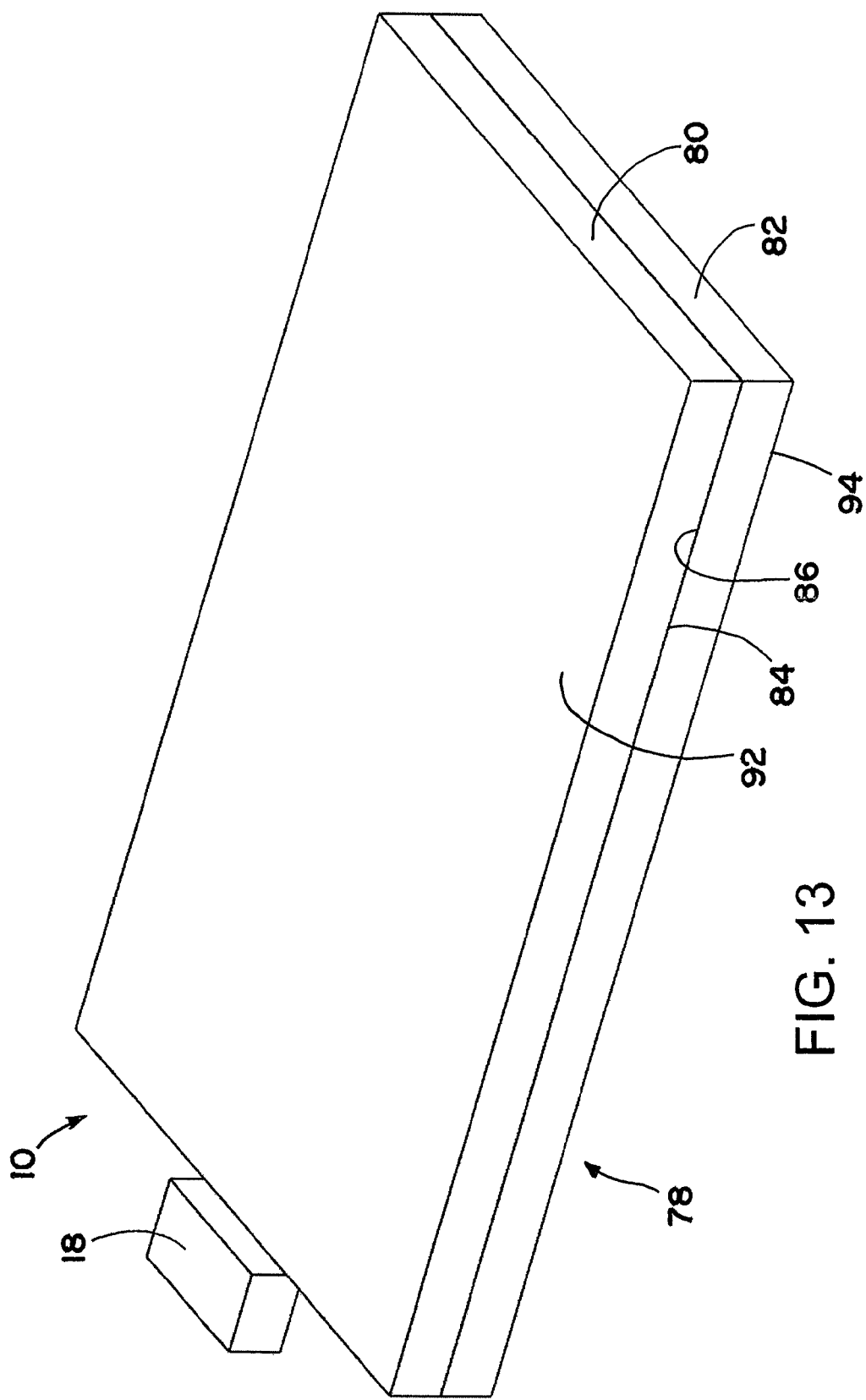

As another example, as illustrated in FIG. 12, the additional optical adjuster 58 having more than one optical adjuster region that each has a respective optical characteristic to further modify light output by the lighting assembly 10 is located adjacent the opposite side of the light guide 20 from the optical adjuster 46. In the illustrated embodiment, the additional optical adjuster 58 has a first optical adjuster region 66 aligned with the first optical adjuster region 52 of the optical adjuster 46, and has a second optical adjuster region 68 aligned with the second optical adjuster region 54 of the first optical adjuster 46. Also, the light guide 20 outputs light from both major surfaces 22 and 24. However, the area of the major surfaces 22, 24 of the light guide from which the light is output depends on the variable relative positioning of the light guide 20 and the light source 18.

In one configuration, and as illustrated, the optical adjuster regions 52 and 68 are transmissive and the optical adjuster regions 54 and 66 are reflective. In one embodiment, in addition to being transmissive, the optical adjuster regions 52 and 68 have at least one additional optical characteristic, such as diffusive, light redirecting, polarizing, intensity reducing, wavelength shifting or color attenuating. In this manner, light output from the first light output region 28 of first major surface 22 and incident on the first optical adjuster region 52 exits the lighting assembly 10 in a direction away from the first major surface 22 as indicated by arrow 70. As indicated by arrow 72, light output from the first light output region 28 of the second major surface 24 of light guide 20 is incident on the first optical adjuster region 66 that reflects the light back through the second major surface 24, through the light guide 20 and out through the first major surface 22 to be incident on the first optical adjuster region 52, which transmits the light. The light transmitted by the optical adjuster region 52 is modified by the optical characteristic thereof. Similarly, light output from the second light output region 30 of second major surface 24 and incident on the second optical adjuster region 68 exits the lighting assembly 10 in a direction away from the second major surface 24 as indicated by arrow 74. As indicated by arrow 76, light output from the second light output region 30 of the first major surface 22 of light guide 20 is incident on the second optical adjuster region 54 that reflects the light back through the second major surface 22, through the light guide 20 and out through the second major surface 24 to be incident on the second optical adjuster region 68, which transmits the light. The light transmitted by the optical adjuster region 68 is modified by the optical characteristic thereof. In this embodiment, the direction (e.g., as indicated by arrows 70, 72 or by arrows 74, 76) in which light is emitted by the lighting assembly 10 is controlled by the relative positioning of the light source 18 and the light guide 20.

With additional reference to FIGS. 13-20, schematically illustrated is another embodiment of part of the lighting assembly 10 having an adjustable light output. In this embodiment, a light guide assembly 78 includes a first light guide 80 and a second light guide 82. Additional light guides that are stacked with the light guides 80, 82 may be present. The light guides 80 and 82 have respective inner major surfaces 84 and 86 that are juxtaposed and conform in surface contour to one another, but the major surfaces 84, 86 are separated by a gap sufficient to prevent the disruption of total internal reflection within each light guide. Although the light guides 80, 82 are illustrated as being similar in shape, the light guides 80, 82 may differ in one or more of length, width and thickness.

Referring additionally to FIGS. 14-20, similar to the previous embodiments, the light source 18 and the light guide assembly 78 are variably positionable relative to each other. In the examples shown, the light source 18 is positioned so that more of the light from the light source 18 is input into the first light guide 80 through the light input edge 88 thereof than is input into the second light guide 82 through the light input edge 90 thereof (FIGS. 14 and 18), or more of the light is input into the second light guide 82 through the light input edge 90 thereof than is input into the first light guide 80 through a light input edge 88 thereof (FIGS. 16 and 20), or the light is apportioned between the first light guide 80 and the second light guide 82 by inputting light through the both light input edges 88 and 90 (FIGS. 15 and 19, showing apportionment that is approximately equal between the two light guides 80 and 82).

In this embodiment, the first light guide 80 outputs light with a first characteristic and the second light guide 82 outputs light with a second characteristic, which is different than the first characteristic. Exemplary characteristics of the output light are identified above. In the embodiments of FIGS. 13-17, the relative positioning of the light source 18 with respect to the light guide assembly 78 varies in a direction parallel to the light input edges 88, 90 and orthogonal to major surfaces of light guides 80, 82. The relative positioning of the light source 18 and the light guides 80, 82 can additionally vary in a direction parallel to the light input edges 88, 90 and parallel to the major surfaces 84, 86 of the light guides 80, 82 to provide additional light output characteristics using, for example, the embodiments of FIGS. 3-12.

In one embodiment, the characteristic of the light output from the lighting assembly is light output direction. For example, with reference to FIGS. 14-16, depending on the relative positioning of the light source 18 and the light guide assembly 78, more light is output from the outer major surface 92 of the first light guide 80 than is output from the outer major surface 94 of the second light guide 82 (FIG. 14); more light is output from the outer major surface 94 of the second light guide 82 than is output from the outer major surface 92 of the first light guide 80 (FIG. 16); or similar amounts of light are output from both the outer major surface 92 of the first light guide 80 and the outer major surface 94 of the second light guide 82 (FIG. 15).

Figure 16:
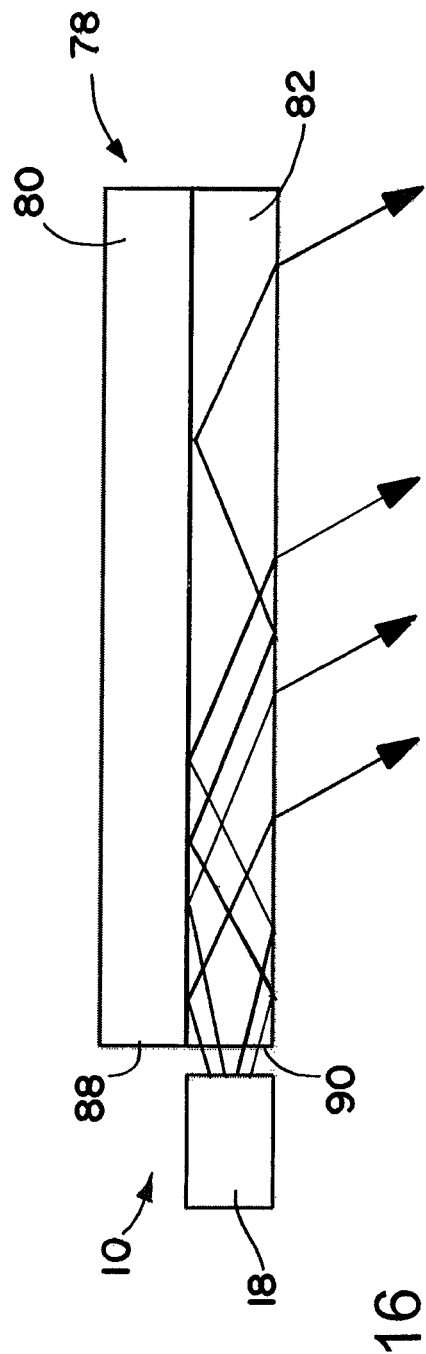
Figure 17:
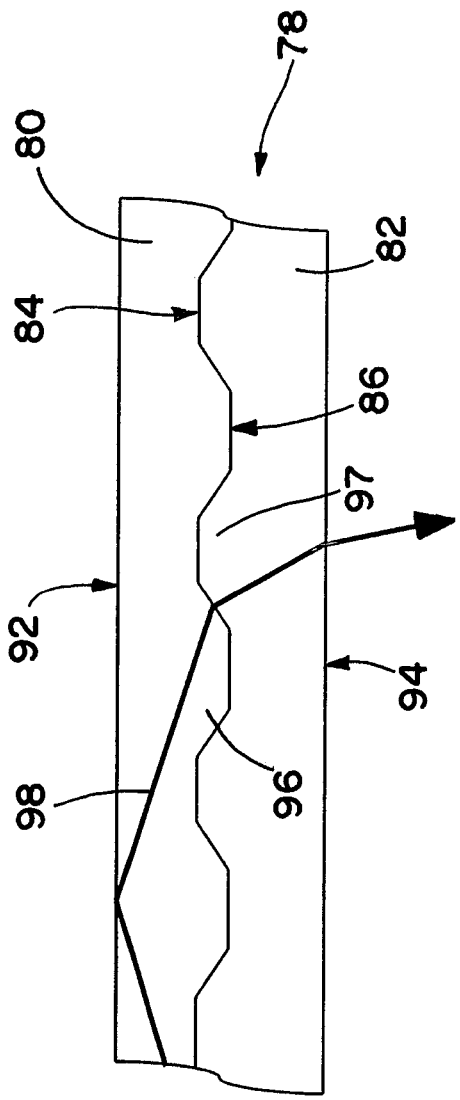

In some examples of the embodiment shown in FIGS. 14-16, light extracting elements of the light guides 80, 82 are configured so that light entering the light input edge 88 exits the first light guide 80 through the outer major surface 92 and so that light entering the light input edge 90 exits the second light guide 82 through the outer major surface 94. In other examples, light extracting elements of the light guides 80, 82 are configured so that light entering the light input edge 88 exits the second light guide 82 through the outer major surface 94 and so that light entering the light input edge 90 exits the first light guide 80 through the outer major surface 92. As shown in FIG. 17, light extracting elements of the light guides 80, 82 are configured so that light entering the light input edge 88 of the first light guide 80 exits the first light guide 80 through the inner major surface 84, enters the second light guide 82 through the inner major surface 86, passes through the second light guide 82 and exits through the outer major surface 94 of the second light guide 82. Additionally, the light extracting elements are configured so that light entering the light input edge 90 of the second light guide 82 exits the second light guide 82 through the inner major surface 86, enters the first light guide 80 through the inner major surface 84, passes through the first light guide 80 and exits through the outer major surface 92 of the first light guide 80. In this exemplary embodiment, the surfaces 84 and 86 have cooperating light extracting elements 96 such that light extracted from one of the light guides 80, 82 enters the other of the light guides at an angle such that the light does not propagate within the other of the light guides by total internal reflection. FIG. 17 shows an example in which inner major surfaces 84, 86 are mating surfaces in which protrusions from one of the surfaces are accommodated within depressions in the other of the surfaces, and vice versa. In FIG. 17, as depicted by light ray 98, light that has entered the light input edge 88 (FIG. 14) of the first light guide 80 travels by total internal reflection through the first light guide 80. Portions of the light incident on an exemplary light extracting element 96 exits the first light guide 80 by refraction by the light extracting element 96 and enters the second light guide 82 through an exemplary light extracting element 97. The light then passes through the second light guide 82 and, when incident on the outer major surface 94, exits the second light guide 82 by refraction. Light entering the light guide assembly 78 through the light input surface 90 of the second light guide 82 behaves similarly, and exits the light guide assembly 78 through the outer major surface 92 of the first light guide 80.

Figure 20:
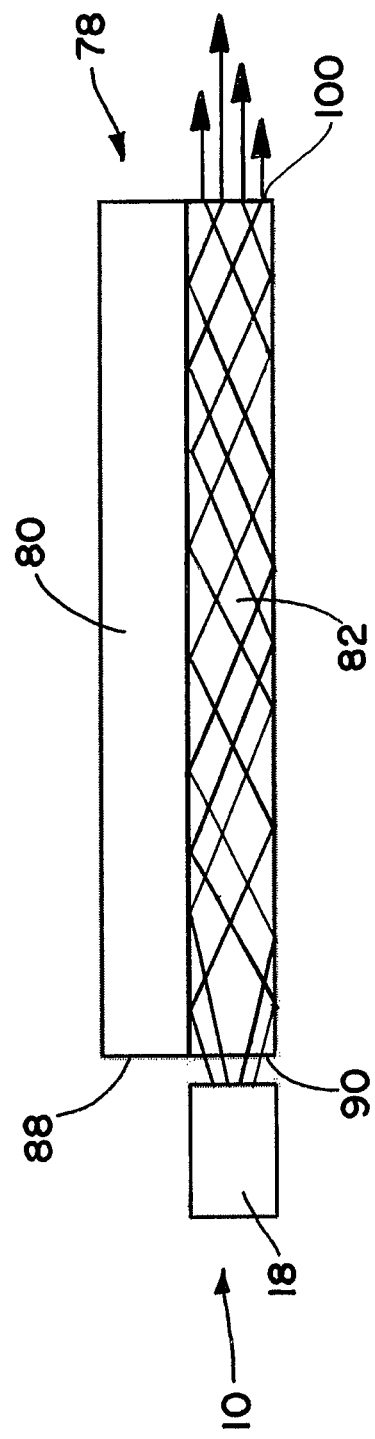

As another example, with reference to FIGS. 18-20, depending on the relative positioning of the light source 18 and the light guide assembly 78 to apportion light input between the light guides 80, 82, more light is output from the outer major surface 92 of the first light guide 80 than from an edge 100 of the second light guide 82 distal the light input edge 90 (FIG. 18), or more light is output from the edge 100 of the second light guide 82 than from the outer major surface 92 of the first light guide 80 (FIG. 20), or similar amounts of light are output from both the major surface 92 of the first light guide 80 and the edge 100 of the second light guide 82 (FIG. 19). Light extracting elements at one or both of the major surfaces 84, 92 of the first light guide 80 are configured to output light through the outer major surface 92. Also, in the example shown, the second light guide 82 does not have light extracting elements so that light propagates through the light guide 82 until it is incident on the distal edge 100 and exits the light guide 82 by refraction. The edge 100 may include an anti-reflective coating to maximize light transmission through the edge. In a variation, the second light guide 82 has light extracting elements configured so that a portion of the light that propagates through the light guide 82 exits the outer major surface 94 and another portion (typically the remainder) of the light exits the edge 100.

With reference to all of the figures, a characteristic of the light output of the lighting assembly 10 is modified based on the variable relative positioning of the light source 18 and the light guide 20 (or, in some embodiments, the variable relative positioning of the light source 18 and the light guide assembly 78). The modification further depends on the optical characteristics associated with each light output region of the light guide 20 or light guide assembly 78. For example, the relative positioning may be varied to selectively provide a light output from the lighting assembly with a light ray angle distribution that is a first light ray angle distribution, or a second light ray angle distribution, different from the first light ray angle distribution, or is any intermediate light ray angle distribution between the first and second light ray angle distributions.

The color of the light output by the lighting assembly 10 may be changed using a color filter layer on or as part of the optical adjuster 46 in one or both regions 52, 54 thereof, or on or as part of the light guide 20; a color filtering material composition of the optical adjuster 46 in one or both regions 52, 54 thereof, or on or as part of the light guide 20; a dichroic filter on or as part of the optical adjuster 46 in one or both regions 52, 54 thereof, or on or as part of the light guide 20; or a wavelength shifting material on or as part of the optical adjuster 46 in one or both regions 52, 54 thereof, or on or as part of the light guide 20. In one example, the lighting assembly 10 is configured to change color temperature of the light output. Many LED light sources 18 emit light in an intended range of wavelengths to achieve a corresponding color temperature. However, within batches of LEDs having the same nominal color temperature, there is variation from LED to LED. Also, sometimes broad-spectrum LEDs (e.g., "white light" LEDs) or groups of tri-color LEDs (e.g., a red LED, a blue LED and a green LED whose outputs combine to produce white light) do not produce a color temperature that is desirable to a user or appropriate for a certain lighting application. To modify the color temperature of the light output from the lighting assembly 10, an optical characteristic associated with the first region 28, and possibly with the second region 30, may be used. For instance, the optical characteristic associated with the first region 28 may modify the light output to be warmer (either or both of more red and less blue) and the optical characteristic associated with second region 30 may modify the light output to be cooler (either or both of more blue and less red).

Some embodiments are configured to allow a user to adjust the color temperature of light output from the lighting assembly 10 in order to achieve a desired color temperature. Other embodiments are configured to allow a manufacturer of the lighting assembly 10 to adjust the color temperature of light output from the lighting assembly 10 to compensate for different color temperatures associated with different lots of light sources 18. This allows the lighting assembly manufacturer to source a broader range of light sources 18 from one or more suppliers and still manufacture lighting assemblies with a defined, consistent color temperature.

In some embodiments, the relative positioning of the light guide 20 and the light source 18 is varied by the manufacturer of the lighting assembly 10 until the output light has a defined characteristic (e.g., a defined color temperature is obtained). The relative positioning is then fixed by the manufacturer of the lighting assembly 10 and the lighting assembly 10 is configured in a manner that minimizes the ability of a user of the lighting assembly 10 to further vary the relative positioning. In other embodiments, the user has the ability to vary the relative positioning.

Other applications will be apparent based on using any combination of the above-noted optical characteristics and structural embodiments.

In yet another embodiment, the light source assembly 16 includes another light source that does or does not move relative to the light guide 20. In this embodiment, the additional light source is selectively illuminated to further change the location at which the light is input to the light guide 20.

Returning to FIG. 1, additional details regarding the lighting assembly 10 when embodied as the light bulb 12 will be described. The light bulb 12 includes a base 102. The illustrated base 102 is an Edison base, but other types of bases 102 may be used, including any commercially-standard base or proprietary base used for mechanically securing an incandescent bulb, a fluorescent bulb, a compact fluorescent bulb (CFL), a halogen bulb, a high intensity discharge (HID) bulb, an arc lamp, or any other type of bulb into a lamp, a lighting fixture, a flashlight, a socket, etc., and/or for supplying electricity thereto. The bulb 12 typically further includes a heat sink 104 that dissipates heat generated by the light sources 18. The heat sink 104 of the illustrated embodiment forms part of the housing 36. Parts of the light bulb 12, such as the light guide 20 and the light source 18, are described above with reference to FIGS. 3-20.

References herein to a "light bulb" are meant to broadly encompass light-producing devices that fit into and engage any of various fixtures for mechanically mounting the light-producing device and for providing electrical power thereto. Examples of such fixtures include, without limitation, screw-in fixtures for engaging an Edison light bulb base, a bayonet fixture for engaging a bayonet light bulb base, or a bi-pin fixture for engaging a bi-pin light bulb base. Thus the term "light bulb," by itself, does not provide any limitation on the shape of the light-producing device, or the mechanism by which light is produced from electric power. Also, the light bulb need not have an enclosed envelope forming an environment for light generation. The light bulb may conform to American National Standards Institute (ANSI) or other standards for electric lamps, but the light bulb does not necessarily have to have this conformance.

Returning to FIG. 2, additional details regarding the lighting fixture 14 will be described. The lighting fixture 14 may be a hanging light (as shown), a ceiling light (e.g., an assembly to fit in a drop-down ceiling or secure flush to a ceiling), a wall sconce, a table lamp, a task light, or any other illumination device. The lighting fixture includes a housing 106 for retaining the light source assembly 16 and the light guide 20. The housing 106 may retain or may serve as a heat sink. In some embodiments, the lighting fixture 14 includes a mechanism 108 (e.g., a chain or wire in the case of a hanging light, clips or fasteners in the case of a ceiling light or wall sconce, etc.) to mechanically secure the lighting assembly to a retaining structure (e.g., a ceiling, a wall, etc.). In other embodiments, the mechanism 108 is a stand and/or base assembly to allow the lighting fixture 14 to function as a floor lamp, table lamp, task lamp, etc. Electrical power is supplied to the lighting fixture through appropriate conductors, which in some cases may form part of or pass through the mechanism 108. Parts of the light bulb 12, such as the light guide 20 and the light source 18, are described above with reference to FIGS. 3-20.

In this disclosure, the phrase "one of" followed by a list is intended to mean the elements of the list in the alterative. For example, "one of A, B and C" means A or B or C. The phrase "at least one of" followed by a list is intended to mean one or more of the elements of the list in the alterative. For example, "at least one of A, B and C" means A or B or C or (A and B) or (A and C) or (B and C) or (A and B and C).

What is claimed is:

1. A lighting assembly, comprising:
   a light guide comprising a solid and light transmissive medium having:
      opposed major surfaces between which light propagates by total internal reflection, the opposed major surfaces spaced apart in a thickness direction of the light guide;
      a light input edge that extends in the thickness direction between the opposed major surfaces and having a surface area through which the light is received into the light guide; and
      two light regions at least one of which is associated with one of the major surfaces, each light output region being associated with a different optical characteristic and the at least one light output region associated with one of the major surfaces defined by light extracting elements at least one of the major surfaces of the light guide, the light extracting elements disrupting the total internal reflection of the propagating light in the light guide to output the light from the light guide via the respective light output region; and
   a light source located adjacent the light input edge to input light into the light guide through the surface area of the light input edge, the light source and the light guide variably positionable relative to one another to vary a location on the surface area of the light input edge at which the light is input to the light guide;
   wherein, due to the relative positioning of the light source and the light guide, the light is emitted from the light guide selectively apportioned between the light output regions and with a characteristic of the light output from the lighting assembly modified based on the optical characteristics associated with the light output regions.

2. The lighting assembly of claim 1, wherein the characteristic of the light output from the lighting assembly that is modified is spectrum.

3. The lighting assembly of claim 1, wherein the characteristic of the light output from the lighting assembly that is modified is color temperature.

4. The lighting assembly of claim 1, wherein the characteristic of the light output from the lighting assembly that is modified is light output direction.

5. The lighting assembly of claim 1, wherein the optical characteristics associated with the light output regions differ in an amount of a single optical characteristic.

6. The lighting assembly of claim 5, wherein the optical characteristic is at least one of reflective, diffusive, light redirecting, polarizing, reflective polarizing, intensity reducing, wavelength shifting and color attenuation.

7. The lighting assembly of claim 1, wherein the optical characteristic associated with a first one of the light output regions imposes a first characteristic on the output light, the optical characteristic associated with a second one of the light output regions imposes a different characteristic on the output light, and the optical characteristics are at least one of reflective, diffusive, light redirecting, polarizing, reflective polarizing, intensity reducing, wavelength shifting and color attenuation.

8. The lighting assembly of claim 1, further comprising an optical adjuster comprising a major surface juxtaposed with and conforming to one of the major surfaces of the light guide and wherein the association of optical characteristics with the light output regions is achieved by respective optical adjuster regions of the optical adjuster aligned with the light output regions.

9. The lighting assembly of claim 8, wherein the optical adjuster is a first optical adjuster and the lighting assembly further comprises a second optical adjuster superposed with the first optical adjuster, the second optical adjuster comprising optical adjuster regions with different optical characteristics to increase the number of light output characteristics of the lighting assembly based on the optical characteristic of the second optical adjuster and the relative positioning of the light source and the light guide.

10. The lighting assembly of claim 8, wherein the optical adjuster is a first optical adjuster and the lighting assembly further comprises a second optical adjuster having a major surface juxtaposed with and conforming to the other of the major surfaces of the light guide, wherein the second optical adjuster has optical adjuster regions with different optical characteristics.

11. The lighting assembly of claim 10, wherein the first optical adjuster has a transmissive optical adjuster region and a reflective optical adjuster region, and the second optical adjuster has a reflective optical adjuster region aligned with the transmissive optical adjuster region of the first optical adjuster and has a transmissive region aligned with the reflective optical adjuster region of the first optical adjuster.

12. The lighting assembly of claim 11, wherein at least one of the transmissive optical adjuster regions additionally is at least one of diffusive, light redirecting, polarizing, intensity reducing, wavelength shifting and color attenuating.

13. The lighting assembly of claim 1, wherein:
the light extracting elements are first light extracting elements defining a first one of the light output regions; and
the guide further comprising second light extracting elements at least one of the major surfaces of the light guide, the second light extracting elements defining a second one of the light output regions, the first and second light extracting elements respectively configured to achieve the different optical characteristics associated with the first light output region and the second light output region.

14. The lighting assembly of claim 13, wherein the first light extracting elements differ from the second light extracting elements in at least one of size, shape, depth or height, density, orientation, slope angle and index of refraction such that the first light output region outputs light with a different intensity profile than the second light output region.

15. The lighting assembly of claim 13, wherein the first light extracting elements differ from the second light extracting elements in at least one of size, shape, depth or height, density, orientation, slope angle and index of refraction such that the first light output region outputs light with a different light ray angle distribution than the second light output region.

16. The lighting assembly of claim 13, wherein the light extracting elements are light-scattering elements.

17. The lighting assembly of claim 13, wherein the light extracting elements have well-defined shapes.

18. The lighting assembly of claim 13, wherein the light extracting elements are micro-optical elements.

19. The lighting assembly of claim 1, wherein the light source is a solid state light source.

20. The lighting assembly of claim 1, wherein each light output region is associated with the same one of the major surfaces.

21. The lighting assembly of claim 1, wherein each light output region is associated with a respective one of the major surfaces.

22. The lighting assembly of claim 1, wherein one of the light output regions is associated with one of the major surfaces and the other of the light output regions is associated with an edge of the light guide opposite the light input edge.

23. A lighting assembly, comprising:
a first light guide comprising a solid and light transmissive medium having:
opposed inner and outer major surfaces between which light propagates by total internal reflection, the opposed major surfaces spaced apart in a thickness direction of the light guide;
a light input edge that extends in the thickness direction between the opposed major surfaces and having a surface area through which the light is received into the light guide; and
a light output region associated with an optical characteristic;
a second light guide comprising a solid and light transmissive medium having:
opposed inner and outer major surfaces between which light propagates by total internal reflection, the opposed major surfaces spaced apart in a thickness direction of the light guide;
a light input edge that extends in the thickness direction between the opposed major surfaces and having a surface area through which the light is received in the light guide; and
a light output region associated with an optical characteristic, the inner major surface of the second light guide juxtaposed and conforming to the inner major surface of the first light guide; and
a light source located adjacent the light input edges, the light source and the light input edges variably positionable relative one another to selectively apportion light between an amount of light input into the first light guide through the surface area of the light input edge of the first light guide and output from the light output region of the first light guide and an amount of light input into the second light guide through the surface area of the light edge of the second light guide and output from the light output region of the second light guide; and wherein a characteristic of the light output from the lighting assembly is modified based on the optical characteristics associated with the light output regions and the relative positioning of the light source and the light input edges.

24. The lighting assembly of claim 23, wherein each light output region is associated with the respective one of the outer major surfaces.

25. The lighting assembly of claim 23, wherein each light output region is associated with the outer major surface of the other light guide.

26. The lighting assembly of claim 23, wherein one of the light output regions is associated with the respective one of the outer major surfaces and the other of the light output regions is associated with an edge of the respective light guide opposite the respective light input edge.

27. The lighting assembly of claim 23, wherein the light guides have respective light extracting elements.

28. The lighting assembly of claim 23, wherein the relative positioning of the light source and the light input edges determines an amount of the light that exits through the outer major surface of the first light guide and an amount of the light that exits through the outer major surface of the second light guide.

29. The lighting assembly of claim 23, wherein the relative positioning of the light source and the light input edges determines an amount of the light that exits through one or both of the outer major surfaces and an amount of the light that exits through an edge of one of the light guides opposite the corresponding light input edge.

30. The lighting assembly of claim 23, wherein the light source is a solid state light source.

* * * * *